United States Patent
Yu et al.

(10) Patent No.: US 11,586,941 B2
(45) Date of Patent: Feb. 21, 2023

(54) RECOMMENDATION METHOD AND APPARATUS

(71) Applicant: Huawei Technologies Co., Ltd., Shenzhen (CN)

(72) Inventors: Jinkai Yu, Shenzhen (CN); Ruiming Tang, Shenzhen (CN); Zhenhua Dong, Shenzhen (CN); Yuzhou Zhang, Shenzhen (CN); Weiwen Liu, Hong Kong (CN); Li Qian, Shenzhen (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 297 days.

(21) Appl. No.: 15/931,224

(22) Filed: May 13, 2020

(65) Prior Publication Data

US 2020/0272913 A1    Aug. 27, 2020

Related U.S. Application Data

(63) Continuation of application No. PCT/CN2019/085890, filed on May 7, 2019.

(30) Foreign Application Priority Data

Nov. 30, 2018   (CN) .......................... 201811458570.X

(51) Int. Cl.
G06N 5/04      (2006.01)
G06N 20/00     (2019.01)

(52) U.S. Cl.
CPC ............... *G06N 5/04* (2013.01); *G06N 20/00* (2019.01)

(58) Field of Classification Search
CPC ........ G06F 16/285; G06F 40/30; G06F 40/20; G06F 16/242; G06F 16/245
(Continued)

(56) References Cited

U.S. PATENT DOCUMENTS 5,991,735 A  * 11/1999 Gerace ................ H04L 12/1859
                                                             705/7.29
11,270,334 B2 *  3/2022 Michaeli ............ G06Q 30/0254
(Continued)

FOREIGN PATENT DOCUMENTS

CN       103246672 A     8/2013
CN       104111925 A    10/2014
(Continued)

OTHER PUBLICATIONS

Chang, H., et al. "Wide and Deep Learning for Recommender Systems," arXiv:1606.07792v1 [cs.LG] Jun. 24, 2016, 4 pages.
(Continued)

*Primary Examiner* — Hung T Vy
(74) *Attorney, Agent, or Firm* — Conley Rose, P.C.

(57) ABSTRACT

A recommendation method includes generating a feature sequence based on to-be-predicted data of a user for a target object and according to a preset encoding rule, obtaining probability distribution information corresponding to each feature in the feature sequence, and obtaining, through calculation, a feature vector corresponding to each feature, obtaining a predicted score of the user for the target object based on values of N features and a feature vector corresponding to each of the N features, and recommending the target object to the user when the predicted score is greater than or equal to a preset threshold.

20 Claims, 8 Drawing Sheets

(58) Field of Classification Search
USPC .......................................... 707/736; 706/12
See application file for complete search history.

(56) References Cited

U.S. PATENT DOCUMENTS

| | | |
|---|---|---|
| 2015/0262069 A1 | 9/2015 | Gabriel et al. |
| 2019/0066151 A1* | 2/2019 | Michaeli ................ G06F 3/167 |
| 2019/0130999 A1* | 5/2019 | Oppenheim ............ G16B 5/00 |

FOREIGN PATENT DOCUMENTS

| | | |
|---|---|---|
| CN | 104714971 A | 6/2015 |
| CN | 105718576 A | 6/2016 |
| CN | 106250532 A | 12/2016 |
| CN | 106326369 A | 1/2017 |

OTHER PUBLICATIONS

Guo, H., et al., "DeepFM: A Factorization-Machine based Neural Network for CTR Prediction," Proceedings of the Twenty-Sixth International Joint Conference on Artificial Intelligence, 2017, pp. 1725-1731.

Juan, Y., et al. "Field-aware Factorization Machines for CTR Prediction," in RecSys, 2016, 8 pages.

* cited by examiner

RECOMMENDATION METHOD AND APPARATUS

CROSS-REFERENCE TO RELATED APPLICATIONS

This application is a continuation of International Patent Application No. PCT/CN2019/085890 filed on May 7, 2019, which claims priority to Chinese Patent Application No. 201811458570.X filed on Nov. 30, 2018, both of which are hereby incorporated by reference in their entireties.

TECHNICAL FIELD

This application relates to the field of computer technologies, and in particular, to a recommendation method and an apparatus.

BACKGROUND

Artificial intelligence (AI) is a theory, a method, a technology, or an application system that simulates, extends, and expands human intelligence using a digital computer or a machine controlled by a digital computer, to sense an environment, obtain knowledge, and obtain an optimal result using the knowledge. In other words, artificial intelligence is a branch of computer science, and is intended to understand the essence of intelligence and produce a new intelligent machine that can react in a manner similar to human intelligence. Artificial intelligence is to study design principles and implementation methods of various intelligent machines, to enable the machines to have perception, inference, and decision-making functions. Researches in an artificial intelligence field include a robot, natural language processing, computer vision, decision-making and inference, human-computer interaction, recommendation and search, an AI basic theory, and the like.

Prediction performed through artificial intelligence has been widely applied in a field such as a recommendation system. For example, a predicted score of a user for an object is obtained through artificial intelligence, and then the object is recommended to the user based on the predicted score. An application store is used as an example. Statistics about a predicted score of a user for an application (for example, statistics about a predicted score of clicking the application by the user may be collected, and the predicted score may reflect a possibility of clicking the application by the user) are collected. In this way, applications that interest different users can be learned, and an application is pushed more accurately to each user, to improve user experience. An accurate predicted score of a user for an application may increase a probability of clicking the application by the user in an actual scenario, thereby increasing profits. An implementation for obtaining the predicted score of the user for the application is as follows. The predicted score of the user for the application is obtained based on historical statistics. In an embodiment, a predicted score of the user for each application is obtained by dividing clicks of the application in a historical time period by impressions, and an application with a relatively high click-through rate (CTR) is recommended to the user. However, clicking an application by the user may be affected by a plurality of factors. In the foregoing manner, the predicted score of the user for each application is determined based on only clicks and impressions of the application. Consequently, prediction is inaccurate, and an effective recommendation cannot be implemented.

Therefore, currently, a recommendation method is urgently needed to resolve a technical problem that an object cannot be effectively recommended to a user due to an inaccurate predicted score of the user for the object.

SUMMARY

In view of this, this application provides a recommendation method and an apparatus in order to resolve a technical problem that an object cannot be effectively recommended to a user due to an inaccurate predicted score of the user for the object.

According to a first aspect, an embodiment of this application provides a recommendation method, including generating a feature sequence based on to-be-predicted data of a user for a target object and according to a preset encoding rule, where the feature sequence includes values of N features, and N is an integer, obtaining probability distribution information corresponding to each feature in the feature sequence, and obtaining, through calculation based on the probability distribution information corresponding to each feature, a feature vector corresponding to the feature, obtaining a predicted score of the user for the target object based on the values of the N features and the feature vector corresponding to each of the N features, and recommending the target object to the user when the predicted score is greater than or equal to a preset threshold.

In this embodiment of this application, because the feature vector corresponding to each feature is obtained based on the probability distribution information corresponding to the feature, the feature vector corresponding to each feature is relatively accurate, and a prediction result is also relatively accurate. Compared with a result of determining a feature vector directly through point estimation, a prediction result in this embodiment of the application better meets a real situation.

In a possible design, probability distribution information corresponding to a feature a includes probability distribution information that R elements obey, the feature a is any feature in the feature sequence, and R is an integer, and the obtaining, through calculation based on the probability distribution information corresponding to each feature, a feature vector corresponding to the feature includes calculating, based on the probability distribution information that the R elements obey, a feature vector corresponding to the feature a.

In a possible design, if a first element obeys Gaussian distribution, probability distribution information that the first element obeys includes a mean and a standard deviation of the Gaussian distribution, where the first element is any element in the R elements.

In a possible design, if a second element obeys uniform distribution, probability distribution information that the second element obeys includes a maximum value and a minimum value, where the second element is any element in the R elements.

In a possible design, the calculating, based on the probability distribution information that the R elements obey, a feature vector corresponding to the feature a includes calculating, based on the probability distribution information that the R elements obey and according to a preset policy, a value corresponding to each of the R elements, and obtaining, based on the values corresponding to the R elements, the feature vector corresponding to the feature a, where the feature vector corresponding to the feature a is R-dimensional, and values in R dimensions are in a one-to-one correspondence with the values corresponding to the R elements.

In a possible design, the preset policy is a Thompson sampling (TS) policy or an upper confidence bound (UCB) policy.

In a possible design, the obtaining a predicted score of the user for the target object based on the values of the N features and the feature vector corresponding to each of the N features includes obtaining a contribution of interaction between a feature b and a feature c through calculation based on values of the feature b and the feature c, a feature vector corresponding to the feature b, and a feature vector corresponding to the feature c, where the feature b and the feature c are any two features in the feature sequence, obtaining a contribution of second-order feature interaction based on the contribution of the interaction between the feature b and the feature c, and obtaining the predicted score of the user for the target object based on at least the contribution of the second-order feature interaction.

In a possible design, each feature in the feature sequence corresponds to one feature vector, and the obtaining a contribution of interaction between a feature b and a feature c through calculation based on values of the feature b and the feature c, a feature vector corresponding to the feature b, and a feature vector corresponding to the feature c includes obtaining a first value through calculation based on an inner product of the feature vector corresponding to the feature b and the feature vector corresponding to the feature c, and obtaining the contribution of the interaction between the feature b and the feature c through calculation based on the first value and a product of the values of the feature b and the feature c.

In this way, determining the contribution of the second-order feature interaction in the foregoing manner is equivalent to improving a feature vector corresponding to each feature in a factorization machine (FM) model. Because the feature vector corresponding to each feature is obtained based on the probability distribution information corresponding to the feature, compared with that in the FM model, the feature vector corresponding to each feature is more accurate such that the contribution of the second-order feature interaction is more accurate. Therefore, the predicted score obtained using the method in this embodiment of this application is also more accurate.

In a possible design, each feature in the feature sequence corresponds to M feature vectors, and the feature sequence includes M fields, M feature vectors corresponding to the feature a are M field-aware feature vectors respectively constituted by the feature a and the M fields, and the feature a is any feature in the feature sequence, and the obtaining a contribution of interaction between a feature b and a feature c through calculation based on values of the feature b and the feature c, a feature vector corresponding to the feature b, and a feature vector corresponding to the feature c includes obtaining a second value through calculation based on an inner product of a first feature vector corresponding to the feature b and a second feature vector corresponding to the feature c, where the first feature vector is a field-aware feature vector constituted by the feature b and a field to which the feature c belongs, and the second feature vector is a field-aware feature vector constituted by the feature c and a field to which the feature b belongs, and obtaining the contribution of the interaction between the feature b and the feature c through calculation based on the second value and a product of the values of the feature b and the feature c.

In this way, determining the contribution of the second-order feature interaction in the foregoing manner is equivalent to improving a feature vector corresponding to each feature (in an embodiment, a field-aware feature vector) in a field-aware factorization machine (FFM) model. A feature interaction part in the FFM model uses a field-aware feature vector such that interaction between any feature can be fully expressed and the FFM model has a relatively strong expression capability. However, due to enhancement of the expression capability, the FFM model may be easily over-fitted, in an embodiment, prediction for training data is relatively accurate, but for new data, a relatively large deviation easily exists in a prediction result. Using the method in this embodiment of the application, a field-aware feature vector corresponding to each feature is obtained based on the probability distribution information corresponding to the feature such that the field-aware feature vector corresponding to each feature can be more accurate, and an over-fitting problem can be effectively alleviated.

In a possible design, the obtaining the predicted score of the user for the target object based on at least the contribution of the second-order feature interaction includes obtaining a contribution of a first-order feature based on the values of the N features and a weight value corresponding to each of the N features, obtaining a contribution of higher-order feature interaction based on the values of the N features, the feature vector corresponding to each of the N features, and a weight matrix of a neural network, and performing weighted summation on a reference contribution, the contribution of the first-order feature, the contribution of the second-order feature interaction, and the contribution of the higher-order feature interaction, to obtain the predicted score of the user for the target object.

According to a second aspect, an embodiment of this application provides an apparatus. The apparatus may be an execution device, or may be a semiconductor chip disposed in an execution device. The apparatus has a function of implementing various possible implementations of the first aspect. The function may be implemented by hardware, or may be implemented by hardware by executing corresponding software. The hardware or software includes one or more units or modules corresponding to the foregoing function.

According to a third aspect, an embodiment of this application provides an apparatus, including a processor and a memory. The memory is configured to store a computer-executable instruction. When the apparatus is run, the processor executes the computer-executable instruction stored in the memory such that the apparatus performs the data scheduling method according to the first aspect or any one of the possible designs of the first aspect.

According to a fourth aspect, an embodiment of this application further provides a computer-readable storage medium. The computer-readable storage medium stores an instruction. When the instruction is run on a computer, the computer is enabled to perform the method according to any one of the possible designs of the first aspect.

According to a fifth aspect, an embodiment of this application further provides a computer program product including an instruction. When the computer program product is run on a computer, the computer is enabled to perform the method according to any one of the possible designs of the first aspect.

These aspects or other aspects in this application may be clearer and easier to understand in descriptions of the following embodiments.

DESCRIPTION OF EMBODIMENTS

The following describes the technical solutions in the embodiments of the application with reference to the accompanying drawings in the embodiments of the application. Apparently, the described embodiments are merely some rather than all of the embodiments of the application. All other embodiments obtained by a person of ordinary skill in the art based on the embodiments of the application without creative efforts shall fall within the protection scope of the application.

Figure 1:
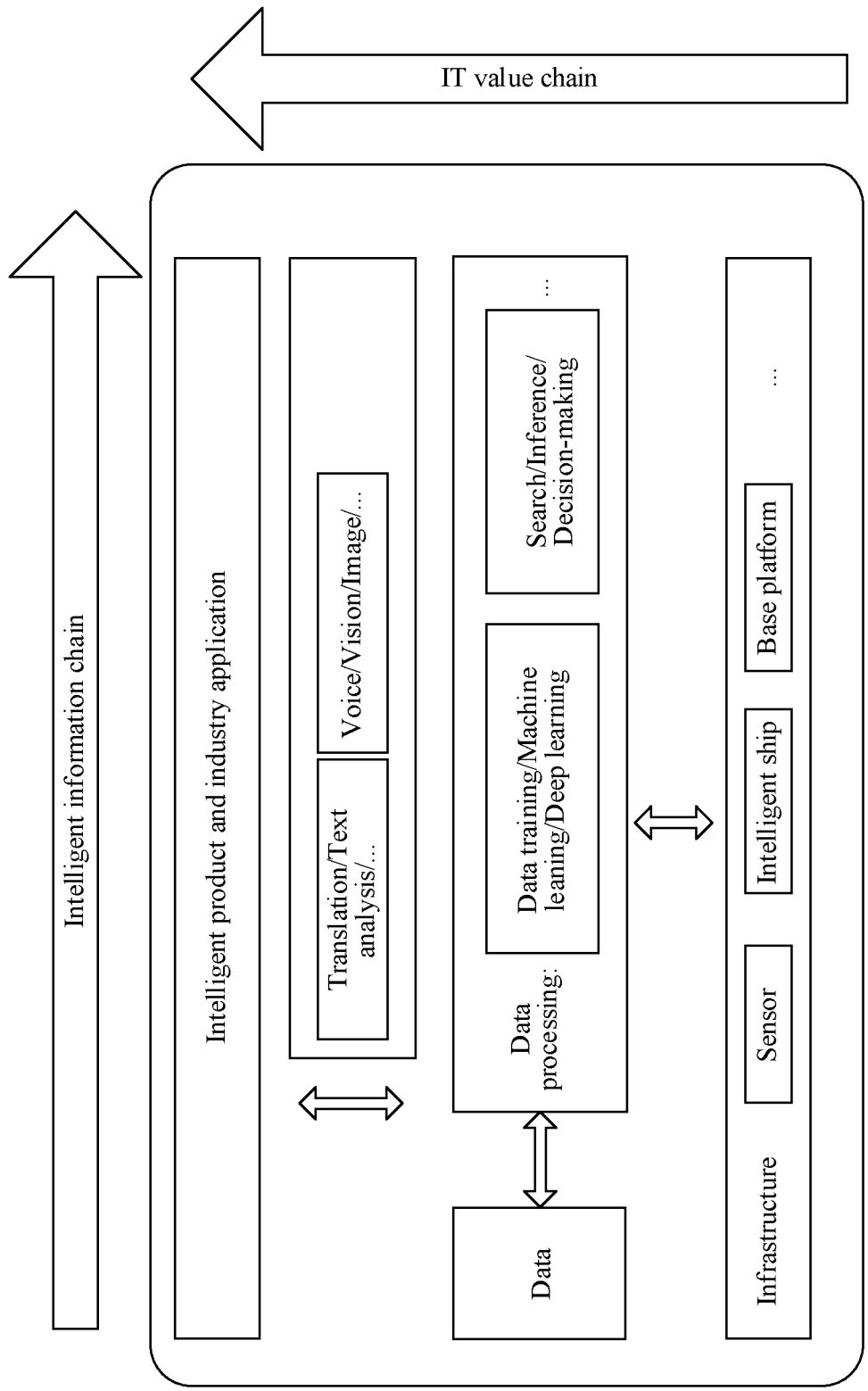
FIG. 1 is a schematic diagram of an artificial intelligence main framework according to an embodiment of the application.

FIG. 1 is a schematic diagram of an artificial intelligence main framework. The main framework describes an overall working procedure of an artificial intelligence system, and is applicable to a requirement of a general artificial intelligence field.

The following describes the foregoing artificial intelligent main framework from two dimensions an "intelligent information chain" (a horizontal axis) and an "IT value chain" (a vertical axis).

The "Intelligent information chain" reflects a series of processes from obtaining data to processing the data. For example, the processes may be general processes of intelligent information perception, intelligent information representation and formation, intelligent inference, intelligent decision-making, and intelligent execution and output. In these processes, the data undergoes a refinement process of "data—information—knowledge—intelligence". The "IT value chain" reflects a value of the information technology industry from an underlying infrastructure and information (providing and processing technology implementation) of human intelligence to a process of industrial ecology of a system.

(1) The infrastructure provides computing capability support for the artificial intelligence system, communicates with an external world, and implements support using a base platform. The infrastructure communicates with the outside using a sensor. A computing capability is provided by an intelligent chip (a hardware acceleration chip such as a central processing unit (CPU), an network processing unit (NPU), a graphics processing unit (GPU), an application-specific integrated circuit (ASIC), or a field-programmable gate array (FPGA)). The base platform includes related platform assurance and support such as a distributed computing framework and a network, and may include cloud storage and computing, and an interconnection and interworking network, and the like. For example, the sensor communicates with the outside to obtain data, and the data is provided to an intelligent chip in a distributed computing system for computation, where the distributed computing system is provided by the base platform.

(2) Data at an upper layer of the infrastructure is used to indicate a data source in the artificial intelligence field. The data relates to a graph, an image, a voice, and text, further relates to internet of things data of a conventional device, and includes service data of an existing system and perception data such as force, displacement, a liquid level, a temperature, and humidity.

(3) The data processing usually includes manners such as data training, machine learning, deep learning, search, inference, and decision-making. The machine learning and the deep learning may refer to performing symbolic and formal intelligent information modeling, extraction, preprocessing, training, and the like on data. The inference refers to a process in which a human intelligent inference manner is simulated on a computer or in an intelligent system, and machine thinking and problem solving are performed using formal information according to an inference control policy. A typical function is search and match. The decision-making refers to a process in which a decision is made after intelligent information is inferred, and usually provides functions such as classification, ranking, and prediction.

(4) After the data processing mentioned above is performed on data, some general capabilities may be further formed based on a data processing result, for example, may be an algorithm or a general-purpose system, such as translation, text analysis, computer vision processing, speech recognition, and image recognition.

(5) Intelligent products and industry applications refer to products and applications of the artificial intelligence system in various fields, and are package of an overall solution of artificial intelligence. Decision making for intelligent information is productized and an application is implemented. Application fields mainly include intelligent manufacturing, intelligent transportation, smart home, smart healthcare, intelligent security protection, automatic driving, a safe city, an intelligent terminal, and the like.

The artificial intelligence has been widely applied to many fields, for example, a field such as a recommendation system. The recommendation system may recommend, using a specific algorithm and based on related data such as a user, an object, and an environment, an object that meets a requirement to the user. The object may be an application, music, a video, news information, or the like. This is not specifically limited. The following mainly uses an application store as an example for description.

In the application store, a large quantity of applications are displayed to a user in a form of a horizontal list or a vertical list. In this case, how the applications are ranked in the list is typically determined by a given optimization objective of the application store. The application store generally includes three types of applications a payment promotion application, a game application, and an ordinary application. For the payment promotion application, an optimization objective of the application store is usually a vested benefit brought by each impression. Therefore, a ranking basis is a CTR (which may be referred to as a click-through rate) x bid (in an embodiment, a benefit that may be obtained from an advertiser for the application store each time of clicking). For the game application, an optimization objective of the application store is generally a long-term benefit brought by each impression. Therefore, a ranking basis is CTR x life time value (LTV) (in an embodiment, an average benefit brought by a single user in a life time of a game). For the ordinary application, an optimization objective is usually downloads during each impression. Therefore, a ranking basis is a CTR. It can be seen that, in an application ranking scenario in the application store, how to accurately obtain a CTR of each application is crucial.

Generally, a click behavior of a user is a result obtained through interaction of a series of factors. For example, a click behavior of a user is affected by a factor. For example, some popular applications are likely to be downloaded by a user, and it indicates that a factor such as an application identifier affects a user click. For another example, a click behavior of a user is affected by interaction between two factors. For example, some take-away applications are likely to be clicked by a user at a meal time, and it indicates that two factors such as a type (a take-away type) of an application and a time (a meal time) comprehensively affect a click behavior of the user. For still another example, a click behavior of a user is affected by interaction between three factors. For example, a young male person likes to download a shooting type game and a role-playing type game, and it indicates that three factors such as an application type (a shooting type and a role playing type), a user age (18 to 30 ages), and a user gender (male) comprehensively affect a click behavior of the user.

Based on the foregoing consideration, currently, three models are proposed an FM model, an FFM model, and a DeepFM model, to determine a predicted score corresponding to an application clicked by a user, and then to recommend an application to the user based on the predicted score corresponding to the application clicked by the user. It should be noted that, in this embodiment of this application, the predicted score corresponding to the application clicked by the user is used to indicate a possibility of clicking the application by the user. A higher predicted score indicates a higher possibility of clicking the application by the user. A value of the predicted score corresponding to the application clicked by the user may range from 0 to 1 or 0 to 100. This is not specifically limited. An example in which the value of the predicted score corresponding to the application clicked by the user ranges from 0 to 1 is used in this embodiment of this application. In an example, the predicted score corresponding to the application clicked by the user may be understood as a click-through rate of the application. For example, for a user a, a predicted score a1 corresponding to an application 1 clicked by the user a, a predicted score a2 corresponding to an application 2 clicked by the user a, and a predicted score a3 corresponding to an application 3 clicked by the user a are determined using any one of the three models. If a value of a3 in a1, a2, and a3 is the largest (which indicates that a possibility of clicking the application 3 by the user a is relatively high), the application 3 may be recommended to the user a.

The following briefly describes the three models separately.

It may be understood that, before actual prediction is performed using any one of the foregoing models, a large amount of sample data needs to be trained to determine a model parameter, and then a predicted score corresponding to an application clicked by a user is obtained based on the determined model parameter. Herein, it is assumed that there are three pieces of sample data for training the model (the FM model, the FFM model, or the DeepFM model) (in a specific implementation, a quantity of pieces of sample data may be far greater than 3, and only a simple example is described herein). As shown in Table 1, each row represents one piece of sample data.

TABLE 1

| Example of sample data | | | |
| --- | --- | --- | --- |
| Click behavior (clicked) of a user | Profession (profession) of the user | Time (time) | Application type (type) |
| 1 | Teacher (teacher) | 2018 Sep. 1 | Education (education) |
| 0 | Engineer (engineer) | 2018 Sep. 2 | Music (music) |
| 1 | Engineer (engineer) | 2018 Aug. 1 | Music (music) |

In Table 1, "1" indicates a click, "0" indicates no click, and "1" and "0" may be understood as labels of sample data. Sample data whose label is "1" may be referred to as a positive sample, and sample data whose label is "0" may be referred to as a negative sample. The profession, time, and application type of the user are three factors that may affect the click behavior of the user. In a machine learning field, the three factors may be understood as three types of features or three fields (field).

For ease of training the model, one-hot encoding processing may be performed on the foregoing data, and an obtained result is shown in Table 2.

TABLE 2

| Example of a one-hot encoding processing result | | | | | | | |
| --- | --- | --- | --- | --- | --- | --- | --- |
| licked | profession = teacher | profession = engineer | time = 2018 Sep. 1 | time = 2018 Sep. 2 | time = 2018 Aug. 1 | type = education | type = music |
| 1 | 1 | 0 | 1 | 0 | 0 | 1 | 0 |
| 0 | 0 | 1 | 0 | 1 | 0 | 0 | 1 |
| 1 | 0 | 1 | 0 | 0 | 1 | 0 | 1 |

It can be learned from Table 2 that, after the encoding processing, the three types of features (three fields) are converted into seven features profession=teacher, profession=engineer, time=2018/9/1, time=2018/9/2, time=2018/8/1, type=education, and type=music. Profession=teacher and profession=engineer belong to one type of feature (that is, the profession) (or may be referred to as one field), time=2018/9/1, time=2018/9/2, and time=2018/8/1 belong to one type of feature (that is, the time), and type=education and type=music belong to one type of feature (that is, the application type). Except the first column, each row may constitute one feature sequence, and the feature sequence includes values of the seven features. Specifically, a feature sequence corresponding to the first piece of sample data is [1 0 1 0 0 1 0], a feature sequence corresponding to the second piece of sample data is [0 1 0

1 0 0 1], and a feature sequence corresponding to the third piece of sample data is [0 1 0 0 1 0 0].

It should be noted that (1) A value of a feature obtained after the one-hot encoding processing may be 0 or 1 shown in the foregoing Table 2, or may be another possible value. This is not specifically limited. (2) In a feature sequence, a value of one of a plurality of features included in each field may be not 0, or values of two or more than two of a plurality of features included in each field may be not 0. This is not specifically limited.

(1) FM Model

An expression of the FM model is as follows $$y_{FM} = w_0 + \sum_{i=1}^{n} w_i x_i + \sum_{i=1}^{n-1} \sum_{j=i+1}^{n} <v_i, v_j> x_i x_j$$

where $y_{FM}$ represents an output result of the FM model, $w_0$ represents a reference contribution, $w_i$ represents a weight value corresponding to each feature, $v_i$ represents a feature vector corresponding to an $i^{th}$ feature, $v_j$ represents a feature vector corresponding to a $j^{th}$ feature, n represents a feature quantity (for example, a feature quantity of each sample data in Table 2 is 7), $x_i$ represents a value of the $i^{th}$ feature (for example, the value 0 or 1 in Table 2), and $x_j$ represents a value of the $j^{th}$ feature (for example, the value 0 or 1 in Table 2).

$$\sum_{i=1}^{n} w_i x_i$$

represents a contribution of a first-order feature, and $$\sum_{i=1}^{n-1} \sum_{j=i+1}^{n} <v_i, v_j> x_i x_j$$

represents a contribution of second-order feature interaction.

It should be noted that, $w_i$, $v_i$, and $v_j$ are all obtained by training sample data. A quantity of dimensions of a feature vector ($v_i$ or $v_j$) (in an embodiment, a quantity of elements included in the feature vector) may be preset, for example, may be 5 or 10.

It can be seen from the expression of the FM model that, the first two parts of the expression are conventional linear models, and in the last part, a mutual relationship between two features is considered.

In an FM model training phase, the three pieces of sample data listed in Table 2 are used as an example. After an N-dimensional vector corresponding to the first piece of sample data is input into the FM model, a predicted score for the first piece of sample data is obtained, the predicted score is compared with an actual score (that is, 1) of the first piece of sample data, and then parameters (for example, a weight value corresponding to each feature and a value of each element included in a feature vector corresponding to the feature) of the FM model are adjusted. In a same way, the weight value corresponding to each feature and the value of each element included in the feature vector corresponding to the feature are adjusted based on an N-dimensional vector corresponding to the second piece of sample data and an N-dimensional vector corresponding to the third piece of sample data. Finally, the weight value corresponding to each feature and the feature vector corresponding to the feature may be obtained through training.

In an FM model prediction phase, after an N-dimensional vector (values of N features) corresponding to to-be-predicted data is input, a contribution of a first-order feature is obtained based on the values of the N features and a weight value corresponding to each of the N features, a contribution of second-order feature interaction is obtained based on the values of the N features and a feature vector corresponding to each of the N features (herein, the feature vector is constituted by values of elements included in a feature vector trained in the training phase), and then a predicted score corresponding to an application clicked by a user may be obtained based on a sum of a preset contribution, the contribution of the first-order feature, and the contribution of the second-order feature interaction.

(2) FFM Model

An expression of the FFM model is as follows $$y_{FFM} = w_0 + \sum_{i=1}^{n} w_i x_i + \sum_{i=1}^{n} \sum_{j=i+1}^{n} <v_{i,f_j}, v_{j,f_i}> x_i x_j$$

where $y_{FFM}$ represents an output result of the FFM model, $w_0$ represents a preset contribution, $w_i$ represents a weight value corresponding to each feature, $v_{i,f_j}$ represents a field-aware feature vector constituted by an $i^{th}$ feature and a field to which a $j^{th}$ feature belongs, $v_{j,f_i}$ represents a field-aware feature vector constituted by the $j^{th}$ feature and a field to which the $i^{th}$ feature belongs, $f_j$ represents the field to which the $j^{th}$ feature belongs, $f_i$ represents the field to which the $i^{th}$ feature belongs, n represents a feature quantity (for example, a feature quantity of each sample data in Table 2 is 7), $x_i$ represents a value of $i^{th}$ feature (for example, the value 0 or 1 in Table 2), and $x_j$ represents a value of the $j^{th}$ feature (for example, the value 0 or 1 in Table 2).

$$\sum_{i=1}^{n} w_i x_i$$

represents a contribution of a first-order feature, and $$\sum_{i=1}^{n} \sum_{j=i+1}^{n} <v_{i,f_j}, v_{j,f_i}> x_i x_j$$

represents a contribution of second-order feature interaction.

It should be noted that, $w_i$, $v_{i,f_j}$, and $v_{j,f_i}$ are all obtained by training sample data. A quantity of dimensions of a field-aware feature vector ($v_{i,f_j}$ or $v_{i,f_j}$) (in an embodiment, a quantity of elements included in the field-aware feature vector) may be preset, for example, may be 10.

It can be learned from the expression of the FFM model that, on a basis of the FM model, a modeling part of feature interaction is improved in the FFM model. Each feature in the FM model corresponds to one feature vector, and each feature in the FFM model may correspond to a plurality of feature vectors. For example, Table 2 is used as an example. Each feature may correspond to three feature vectors, which further include a field-aware feature vector constituted by the feature and a first field, a field-aware feature vector constituted by the feature and a second field, and a field-aware feature vector constituted by the feature and a third field. In other words, in the FFM model, a field-aware feature vector is used when each feature is interacted with another feature. The foregoing example is still used. When the feature such as profession=teacher (belonging to a feature of a procession type) is interacted with the feature such as type=education (belonging to the feature of the application type), a field-aware feature vector $V_{teacher}$ and application type is used. Therefore, when the two features are interacted, an inner product of field-aware feature vectors may be represented as $<V_{teacher\ and\ application\ type}$, and $V_{education\ and\ profession}>$. Similarly, when the feature such as profession=teacher is interacted with the feature such as time=2018/9/1 (belonging to a feature of a time type), a field-aware feature vector $V_{teacher\ and\ time}$ is used. Therefore, when the two features are interacted, an inner product of field-aware feature vectors may be represented as $<V_{teacher\ and\ time}$, and $V_{2018/9/1\ and\ profession}>$.

In an FFM model training phase, the three pieces of sample data listed in Table 2 are used as an example. After an N-dimensional vector corresponding to the first piece of sample data is input into the FFM model, a predicted score for the first piece of sample data is obtained, the predicted score is compared with an actual score (that is, 1) of the first piece of sample data, and then parameters (for example, a weight value corresponding to each feature and a value of each element included in a field-aware feature vector corresponding to the feature) of the FFM model are adjusted. In a same way, the weight value corresponding to each feature and the value of each element included in the field-aware feature vector corresponding to the feature are adjusted based on an N-dimensional vector corresponding to the second piece of sample data and an N-dimensional vector corresponding to the third piece of sample data. Finally, the weight value corresponding to each feature and the field-aware feature vector corresponding to the feature may be obtained through training.

In an FFM model prediction phase, after an N-dimensional vector (values of N features) corresponding to to-be-predicted data is input, a contribution of a first-order feature is obtained based on the values of the N features and a weight value corresponding to each of the N features, a contribution of second-order feature interaction is obtained based on the values of the N features and a field-aware feature vector corresponding to each of the N features (herein, the field-aware feature vector is constituted by values of elements included in a field-aware feature vector trained in the training phase), and then a predicted score corresponding to an application clicked by a user may be obtained based on a sum of a preset contribution, the contribution of the first-order feature, and the contribution of the second-order feature interaction.

(3) DeepFM Model

An expression of the DeepFM model is as follows $$\hat{y}=sigmoid(y_{FM}+y_{DNN})$$

where $\hat{y}$ represents an output result of the DeepFM model, $y_{FM}$ represents an output result of an FM part of the DeepFM model, and $y_{DNN}$ represents an output result of a deep learning neural network (DNN) part in the DeepFM model. In the DeepFM model, a factorization machine part shares a same input with the neural network part.

It can be learned from the expression of the DeepFM model that, on a basis of the FM model, the FM model is combined with a DNN in the DeepFM model. For each feature, a prediction result obtained in the FM part is used as a contribution of lower-order feature interaction, and a feature vector of the FM model is transferred to the neural network part (which may be a multi-layer full-connection neural network), a prediction result obtained in the neural network part is used as a contribution of higher-order feature interaction, and finally, the two contributions are added to obtain a final prediction result.

In a DeepFM model training phase, the three pieces of sample data listed in Table 2 are used as an example. After an N-dimensional vector corresponding to the first piece of sample data is input into the DeepFM model, a predicted score for the first piece of sample data is obtained, the predicted score is compared with an actual score (that is, 1) of the first piece of sample data, and then parameters (including a weight value corresponding to each feature and a value of each element included in a feature vector corresponding to the feature) of the FM part and a parameter (including a weight matrix of the neural network) of the DNN part are adjusted. In a same way, parameters of the FM part and a parameter of the DNN part are adjusted based on an N-dimensional vector corresponding to the second piece of sample data and an N-dimensional vector corresponding to the third piece of sample data. Finally, the parameters of the FM part and the parameter of the DNN part may be obtained through training.

In a DeepFM model prediction phase, after an N-dimensional vector (values of N features) corresponding to to-be-predicted data is input, a contribution of a first-order feature is obtained based on the values of the N features and a weight value corresponding to each of the N features, a contribution of second-order feature interaction is obtained based on the values of the N features and a feature vector corresponding to each of the N features (herein, the feature vector is constituted by values of elements included in a feature vector trained in the training phase), a contribution of higher-order feature interaction is obtained based on the values of the N features, a feature vector corresponding to each of the N features, and the weight matrix of the neural network, and then a predicted score corresponding to an application clicked by a user may be obtained based on a sum of a preset contribution, the contribution of the first-order feature, the contribution of the second-order feature interaction, and the contribution of the higher-order feature interaction.

It can be learned from the foregoing descriptions of the FM model, the FFM model, and the DeepFM model that, a feature vector corresponding to a feature plays an important role in a prediction result, and a more accurate feature vector corresponding to a feature indicates a more accurate prediction result. When a feature vector corresponding to a feature is trained using the FM model, the FFM model, or the DeepFM model, the feature vector is repeatedly adjusted using training sample data such that the feature vector tends to be accurate. However, because sample data is limited, a feature vector corresponding to a feature (for example, profession=teacher) that exists few times in the sample data and exists in a positive sample in most cases may be not trained accurately enough using the foregoing manner. Consequently, a predicted score corresponding to an application clicked by a user is inaccurate, and an application cannot be effectively recommended to the user.

Based on the above, an embodiment of this application provides a recommendation method in order to improve accuracy of a predicted score of a user for an object, and effectively recommend the object to the user.

Figure 2:
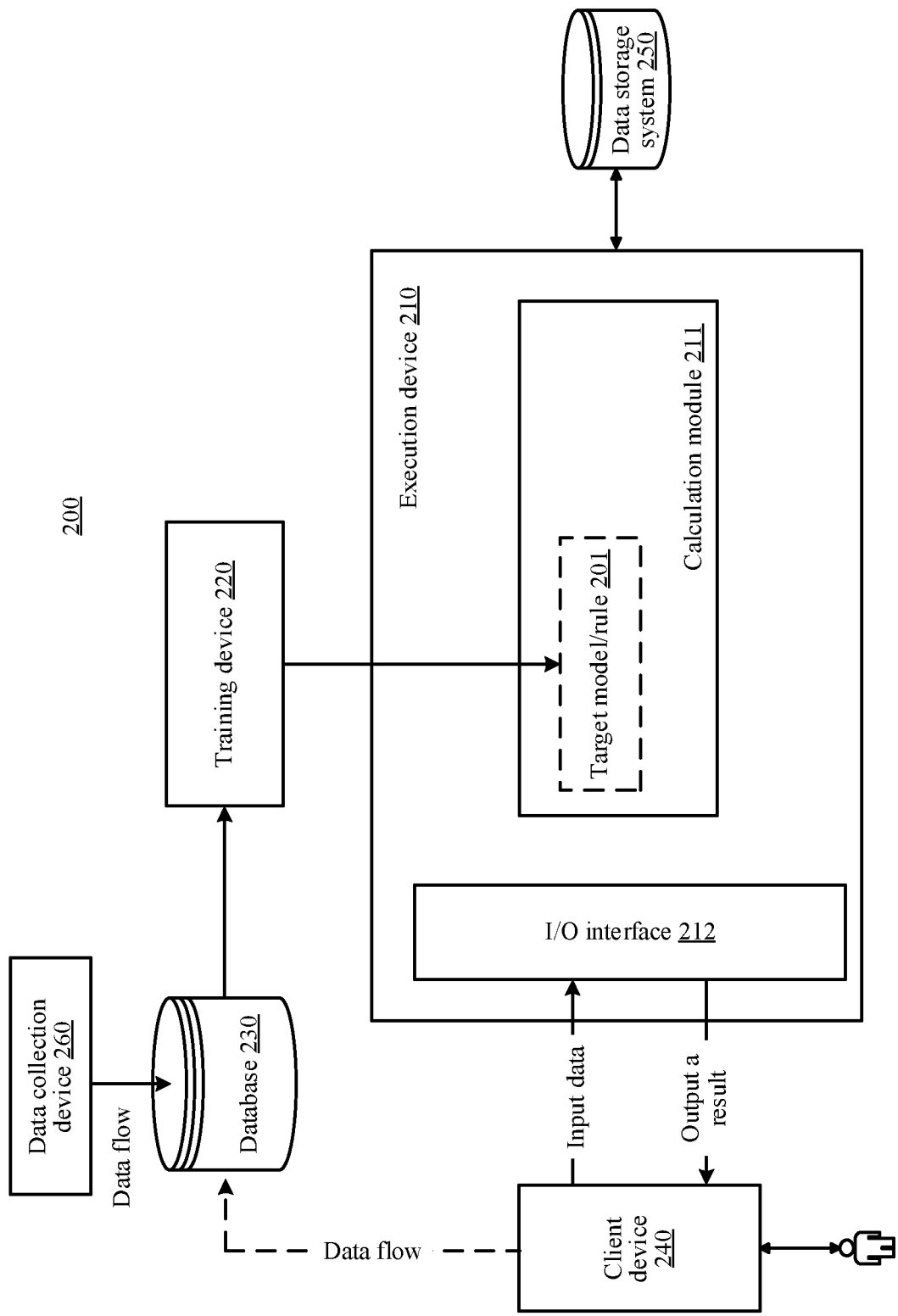
FIG. 2 is a schematic diagram of a system architecture according to an embodiment of the application.

FIG. 2 is a schematic diagram of a system architecture according to an embodiment of the application. The system architecture 200 may include an execution device 210, a training device 220, a database 230, a client device 240, a data storage system 250, and a data collection device 260.

The data collection device 260 is configured to collect sample data and store the sample data into the database 230. The foregoing described application store is used as an example. Each piece of sample data may include values of a plurality of fields, and the plurality of fields may be obtained based on a plurality of factors that affect clicking of an application by a user. The plurality of factors that affect clicking of the application by the user may be factors included in at least one of user information, application information, or environment information. For example, the user information may include factors such as the age of the user, an educational level of the user, a profession of the user, and preference of the user. The application information may include factors such as an identifier of the application and an application type. The environment information may include factors such as time and weather. In this case, in an example, for ease of description, it is assumed that the plurality of fields including the profession of the user, the application type, and the time shown in Table 1 may be an example of three pieces of sample data collected by the data collection device 260.

The training device 220 generates a target model/rule 201 through training based on a plurality of pieces of sample data maintained in the database 230. For a specific training process, refer to a related description in FIG. 6 in the following.

The target model/rule obtained by the training device 220 may be applied to different systems or devices. In FIG. 2, the execution device 210 is configured with an input/output (I/O) interface 212 configured to exchange data with an external device. The user may input to-be-predicted data into the I/O interface 212 using the client device 240.

The execution device 210 may invoke data, code, and the like in the data storage system 250, or may store data, an instruction, and the like into the data storage system 250.

Figure 3:
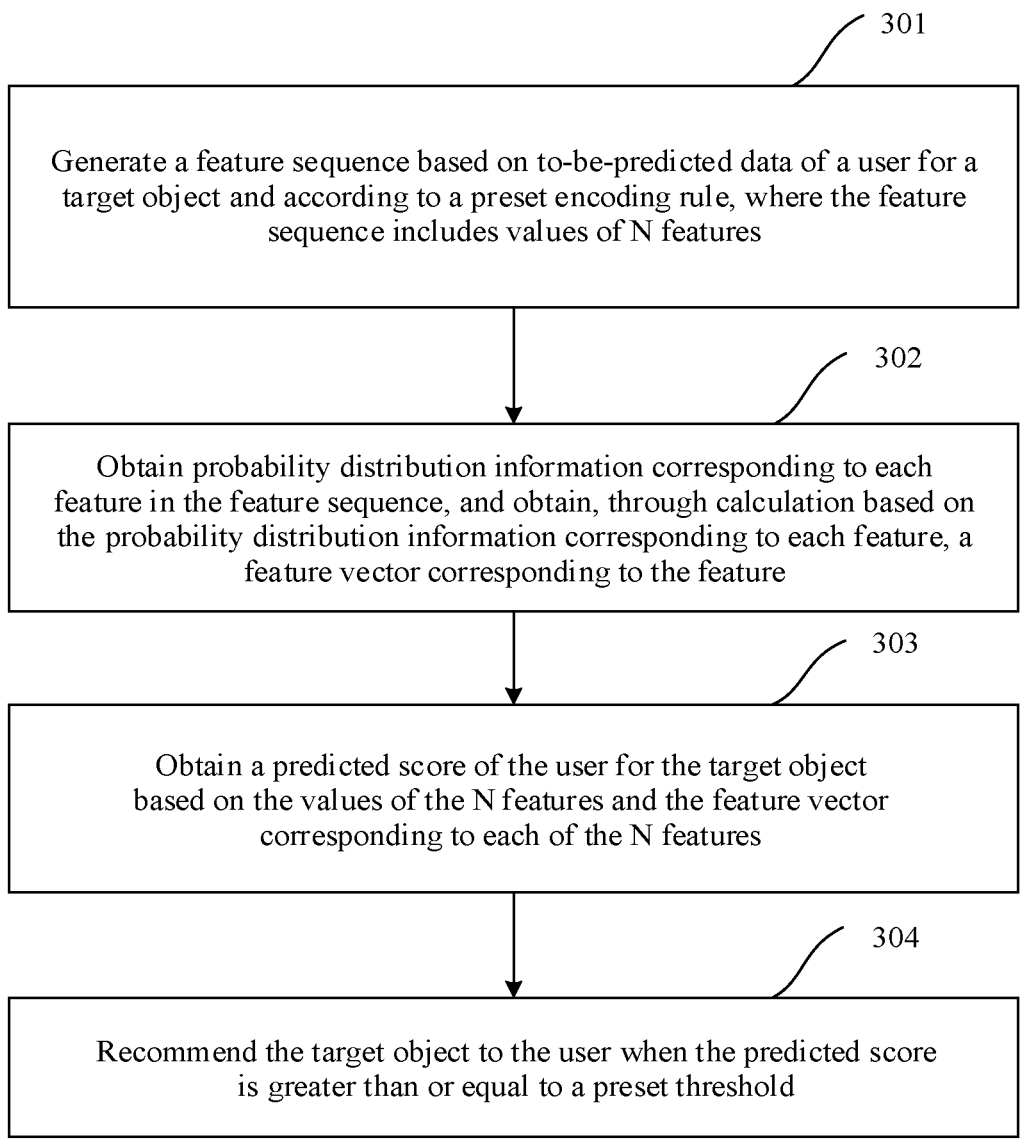
FIG. 3 is a schematic flowchart corresponding to a recommendation method according to an embodiment of this application.

A calculation module 211 processes the input to-be-predicted data (for example, a value of each of the foregoing three fields) using the target model/rule 201 (for a specific processing process, refer to a description in FIG. 3) in order to output a predicted score corresponding to an application clicked by the user.

Finally, the I/O interface 212 returns a processing result to the client device 240. For example, the processing result may include predicted scores corresponding to a plurality of applications clicked by the user such that the client device may recommend an application to the user based on the predicted scores corresponding to the applications clicked by the user. Alternatively, for another example, the processing result may include an identifier of a target application that is obtained by the execution device based on predicted scores corresponding to a plurality of applications clicked by the user. In this case, the client device directly recommends the target application to the user based on the identifier of the target application. This is not specifically limited.

More deeply, the training device 220 may generate, for different targets, corresponding target models/rules 201 based on different data in order to provide a better result for the user.

In a case shown in FIG. 2, the user may manually specify data to be input to the execution device 210, for example, may operate in an interface provided by the I/O interface 212. In another case, the client device 240 may automatically input data into the I/O interface 212 and obtain a result. If the client device 240 needs to obtain permission of the user for automatically inputting data, the user may set corresponding permission on the client device 240. The user may view, on the client device 240, a result output by the execution device 210. A specific presentation form may be a specific manner such as display, a voice, or an action. The client device 240 may also be used as a data collection end to store the collected to-be-predicted data into the database 230.

It should be noted that, FIG. 2 is merely a schematic diagram of a system architecture according to an embodiment of the application. A position relationship between devices, components, modules, and the like shown in the figure does not constitute any limitation. For example, in FIG. 2, the data storage system 250 is an external storage device relative to the execution device 210, and in another case, the data storage system 250 may alternatively be disposed in the execution device 210.

FIG. 3 is a schematic flowchart corresponding to a recommendation method according to an embodiment of this application. As shown in FIG. 3, the method includes the following steps.

Step 301. Generate a feature sequence based on to-be-predicted data of a user for a target object and according to a preset encoding rule, where the feature sequence includes values of N features.

Herein, an application store is used as an example. The target object may be one of a plurality of applications included in the application store. Table 3 shows an example of the to-be-predicted data.

TABLE 3

| Example of the to-be-predicted data | | |
| --- | --- | --- |
| profession | time | type |
| teacher | 2018 Aug. 1 | music |

It can be learned from Table 3 that, the to-be-predicted data includes values of three fields (which are the profession, the time, and the type), where a value of the profession is teacher, a value of the time is 2018/8/1, and a value of the type is music.

The preset encoding rule may be a one-hot encoding rule. Specifically, one-hot encoding processing may be performed on the to-be-predicted data, to obtain the values of the N features. The N features are determined based on training data. Herein, an example in which M fields include the seven features shown in FIG. 2 is used. Table 4 shows an example of the values of the N features, where the values of the N features are obtained based on the to-be-predicted data.

TABLE 4

Example of the values of the N features

| profession = teacher | profession = engineer | time = 2018 Sep. 1 | time = 2018 Sep. 2 | time = 2018 Aug. 1 | type = education | type = music |
|---|---|---|---|---|---|---|
| 1 | 0 | 0 | 0 | 1 | 0 | 1 |

It can be learned from Table 4 that, values of the three features such as profession=teacher, time=2018/8/1, and type=music are 1, and values of the other four features are 0.

Step 302. Obtain probability distribution information corresponding to each feature in the feature sequence, and obtain, through calculation based on the probability distribution information corresponding to each feature, a feature vector corresponding to the feature.

Herein, the feature sequence may further include an identifier of each feature. An identifier of a feature a is used to identify the feature a, and the identifier of the feature a may be a number of the feature a in the feature sequence. This is not specifically limited. In this embodiment of this application, identifiers of a plurality of features in the feature sequence and probability distribution information corresponding to the plurality of features may be pre-stored in an associated manner, and the probability distribution information corresponding to the plurality of features is obtained by training at least one piece of sample data. In this way, probability distribution information corresponding to the feature a may be obtained through query based on the identifier of the feature a.

The probability distribution information corresponding to the feature a may include probability distribution information that R elements (which may be understood as R random variables) obey, the feature a is any feature in the feature sequence, and R is an integer.

It is assumed that the R elements are a1, a2, a3, a4, a5. If the element a1 obeys Gaussian distribution, probability distribution information that a value of the element a1 obeys may include a mean $\mu 1$ and a standard deviation $\sigma 1$ of the Gaussian distribution. If a value of the element a2 also obeys the Gaussian distribution, probability distribution information that the value of the element a2 obeys may include a mean $\mu 2$ and a standard deviation $\sigma 2$ of the Gaussian distribution, where $\mu 1$ may be the same as or different from $\mu 2$, and $\sigma 1$ may be the same as or different from $\sigma 2$. If a value of the element a3 obeys uniform distribution, probability distribution information that the value of the element a3 obeys includes a maximum value and a minimum value.

It should be noted that (1) In this embodiment of this application, the R elements may obey probability distribution of a same type. For example, the R elements all obey the Gaussian distribution, or the R elements all obey the uniform distribution. Alternatively, the R elements may obey probability distribution of different types. For example, the element a1 and the element a2 both obey the Gaussian distribution, and the element a3, the element a4, and the element a5 all obey the uniform distribution. (2) The foregoing merely uses the Gaussian distribution and the uniform distribution as an example. In another possible embodiment, the R elements may alternatively obey probability distribution of another type. This is not specifically limited.

A description is provided in the following using merely an example in which the R elements all obey the Gaussian distribution. Table 5 shows an example of the probability distribution information that the R elements obey.

TABLE 5

Example of the probability distribution information

| Element | Mean | Standard deviation |
|---|---|---|
| a1 | $\mu 1$ | $\sigma 1$ |
| a2 | $\mu 2$ | $\sigma 2$ |
| a3 | $\mu 3$ | $\sigma 3$ |
| a4 | $\mu 4$ | $\sigma 4$ |
| a5 | $\mu 5$ | $\sigma 5$ |

The probability distribution information that the R elements obey may be obtained by training at least one piece of sample data in a training phase, in an embodiment, $\mu 1$, $\mu 2, \ldots$, and $\mu 5$, and $\sigma 1$, $\sigma 2, \ldots$ and $\sigma 5$ listed in Table 5 may be obtained through training. In Table 5, all means constitute a mean vector $[\mu 1, \mu 2, \ldots,$ and $\mu 5]$ corresponding to a $p^{th}$ feature, and all standard deviations constitute a standard deviation vector $[\sigma 1, \sigma 2, \ldots,$ and $\sigma 5]$ corresponding to the $p^{th}$ feature.

There may be a plurality of implementations for calculating, based on the probability distribution information that the R elements obey, a feature vector (for example, a feature vector A) corresponding to the feature i. In a possible implementation, the feature vector A is obtained based on the probability distribution information that the R elements obey and according to a preset policy. The preset policy may be a policy in a multi-armed bandit (multi-armed bandit) field, for example, a TS policy or an UCB policy. The UCB policy is as an example. Values corresponding to the R elements (for example, the value corresponding to the element a1 is k1) may satisfy the following formula $k1=\mu 1+\partial \times \sigma 1$, where $\partial$ represents a hyperparameter and may be specifically a random number between 0 and 1. In this way, the feature vector A=[k1, k2, k3, k4, and k5] may be obtained by calculating a value corresponding to each element. The feature vector A is R-dimensional, and values in R dimensions are in a one-to-one correspondence with the values corresponding to the R elements. It can be learned from the formula that, if a standard deviation of Gaussian distribution that an element obeys is relatively small (it indicates that probability distribution that the element obeys has been fully learned), a parameter value corresponding to the element is relatively close to a mean, or if a standard deviation of Gaussian distribution that the element obeys is relatively large (it indicates that probability distribution that the element obeys has not been fully learned), a parameter value corresponding to the element has a relatively large difference from a mean. In this way, during prediction, a model can find a better parameter value based on a standard deviation.

It can be learned from the foregoing description that, in this embodiment of this application, when a feature vector corresponding to each feature is determined, probability distribution information (for example, a mean and a standard deviation) corresponding to the feature is comprehensively considered. Because a feature that exists few times in a training phase is not fully learned, a standard deviation in probability distribution information corresponding to the feature is relatively large. This is equivalent to introducing prior information in a prediction process. In this way, the feature vector corresponding to each feature is determined based on the probability distribution information corresponding to the feature such that an over-fitting problem that may be caused by the feature that exists few times can be effectively alleviated.

Step 303. Obtain a predicted score of the user for the target object based on the values of the N features and the feature vector corresponding to each of the N features.

Specifically, a contribution of interaction between a feature b and a feature c may be obtained through calculation based on values of the feature b and the feature c, a feature vector corresponding to the feature b, and a feature vector corresponding to the feature c, where the feature b and the feature c are any two features in the feature sequence. A contribution of second-order feature interaction is obtained based on the contribution of the interaction between the feature b and the feature c. Then, the predicted score of the user for the target object is obtained based on at least the contribution of the second-order feature interaction.

The following describes a specific implementation for determining the contribution of the second-order feature interaction.

In a possible implementation (referred to as an implementation 1), each feature in the feature sequence corresponds to one feature vector. In this way, a first value may be obtained through calculation based on an inner product of the feature vector corresponding to the feature b and the feature vector corresponding to the feature c, and then the contribution of the interaction between the feature b and the feature c may be obtained through calculation based on the first value and a product of the values of the feature b and the feature c.

In an example, the contribution of the second-order feature interaction meets the following formula $$y_{second\text{-}order\ 1} = \sum_{i=1}^{n-1} \sum_{j=i+1}^{n} <v_i, v_j> x_i x_j$$

where $y_{second\text{-}order\ 1}$ represents the contribution of the second-order feature interaction, $v_i$ represents a feature vector corresponding to an $i^{th}$ feature, $v_j$ represents a feature vector corresponding to a $j^{th}$ feature, n represents a feature quantity (for example, a feature quantity in Table 4 is 7), $x_i$ represents a value of the $i^{th}$ feature (for example, the value 0 or 1 in Table 4), and $x_j$ represents a value of the $j^{th}$ feature (for example, the value 0 or 1 in Table 4).

Based on the data in Table 4, the following may be obtained through calculation $$y_{second\text{-}order\ 1} = <v_1, v_5> + <v_1, v_7> + <v_5, v_7>.$$

In another possible implementation (referred to as an implementation 2), each feature in the feature sequence corresponds to M feature vectors, and the feature sequence includes M fields, and M feature vectors corresponding to the feature a are M field-aware feature vectors respectively constituted by the feature a and the M fields. For example, feature vectors corresponding to the feature i (for example, profession=teacher) include a feature vector a1, a feature vector a2, and a feature vector a3. The feature vector a1 is a field-aware feature vector constituted by the feature a and a first field (for example, the profession), and when the feature a is interacted with a feature (for example, profession=engineer) in the first field, the feature vector a1 may be used. The feature vector a2 is a field-aware feature vector constituted by the feature a and a second field (for example, the time), and when the feature a is interacted with a feature (for example, time=2018/9/1, time=2018/9/2, or time=2018/8/1) in the second field, the feature vector a2 may be used. The feature vector a3 is a field-aware feature vector constituted by the feature a and a third field (for example, the type), and when the feature a is interacted with a feature (for example, type=education or type=music) in the third field, the feature vector a3 may be used.

It should be noted that, step 302 in the foregoing is described based on an example in which a feature corresponds to one feature vector. If the feature a corresponds to M feature vectors, each of the M feature vectors may be determined based on the manner in step 302. Specifically, if the feature a corresponds to M feature vectors, the probability distribution information corresponding to the feature a may include M groups of probability distribution information, and each group of probability distribution information includes the probability distribution information that the R elements obey. In this way, for the M groups of probability distribution information, the M feature vectors corresponding to the feature a may be obtained.

In this case, a second value may be obtained through calculation based on an inner product of a first feature vector corresponding to the feature b and a second feature vector corresponding to the feature c, where the first feature vector is a field-aware feature vector constituted by the feature b and a field to which the feature c belongs, and the second feature vector is a field-aware feature vector constituted by the feature c and a field to which the feature b belongs. Then, the contribution of the interaction between the feature b and the feature c may be obtained through calculation based on the second value and a product of the values of the feature b and the feature c.

In an example, the contribution of the second-order feature interaction meets the following formula $$y_{second\text{-}order\ 2} = \sum_{i=1}^{n} \sum_{j=i+1}^{n} <v_{i,f_j}, v_{j,f_i}> x_i x_j$$

where $y_{second\text{-}order\ 2}$ represents the contribution of the second-order feature interaction, $v_{i,f_j}$ represents a field-aware feature vector constituted by an $i^{th}$ feature and a field to which a $j^{th}$ feature belongs, $v_{j,f_i}$ represents a field-aware feature vector constituted by the $j^{th}$ feature and a field to which the $i^{th}$ feature belongs, $f_j$ represents the field to which the $j^{th}$ feature belongs, $f_i$ represents the field to which the $i^{th}$ feature belongs, n represents a feature quantity (for example, a feature quantity in Table 4 is 7), $x_i$ represents a value of an $i^{th}$ piece of sample data (for example, the value 0 or 1 in Table 4), and $x_j$ represents a value of the $j^{th}$ piece of sample data (for example, the value 0 or 1 in Table 4).

Based on the data in Table 4, the following may be obtained through calculation $$y_{second\text{-}order\ 2} = <v_{1,f_2}, v_{5,f_1}> + <v_{1,f_3}, v_{7,f_1}> + <v_{5,f_3}, v_{7,f_2}>$$

In this embodiment of this application, there may be a plurality of implementations for obtaining, based on at least the contribution of the second-order feature interaction, a predicted score corresponding to an application clicked by the user. For example, in a possible implementation, a contribution of a first-order feature may be obtained based on the values of the N features and a weight value corresponding to each of the N features, and then weighted summation is performed on a reference contribution, the contribution of the first-order feature, and the contribution of the second-order feature interaction, to obtain the predicted score corresponding to the application clicked by the user.

In this case, obtaining the contribution of the second-order feature interaction based on the foregoing implementation 1 is equivalent to improving a feature vector corresponding to each feature in an FM model. Because the feature vector corresponding to each feature is obtained based on the manner described in step 302, compared with that in the FM model, the feature vector corresponding to each feature is more accurate such that the contribution of the second-order feature interaction is more accurate. Therefore, the predicted score obtained using the method in this embodiment of this application is also more accurate.

Obtaining the contribution of the second-order feature interaction based on the foregoing implementation 2 is equivalent to improving a feature vector corresponding to each feature (in an embodiment, a field-aware feature vector) in an FFM model. A feature interaction part in the FFM model uses a field-aware feature vector such that interaction between any feature can be fully expressed and the FFM model has a relatively strong expression capability. However, due to enhancement of the expression capability, the FFM model may be easily over-fitted, in an embodiment, prediction for training data is relatively accurate, but for new data, a relatively large deviation easily exists in a prediction result. Using the method in this embodiment of the application, a field-aware feature vector is obtained based on the manner described in step 302 such that the feature vector corresponding to each feature can be more accurate, and an over-fitting problem can be effectively alleviated.

In still another possible implementation, a contribution of a first-order feature may be obtained based on the values of the N features and a weight value corresponding to each of the N features, a contribution of higher-order feature interaction is obtained based on the values of the N features, the feature vector corresponding to each of the N features, and a weight matrix of a neural network, and then weighted summation is performed on a reference contribution, the contribution of the first-order feature, the contribution of the second-order feature interaction, and the contribution of the higher-order feature interaction, to obtain a predicted score corresponding to an application clicked by the user.

In this case, obtaining the contribution of the second-order feature interaction based on the foregoing implementation 1 is equivalent to improving a feature vector corresponding to each feature in a DeepFM model. Because the feature vector corresponding to each feature is obtained based on the manner described in step 302, compared with that in the DeepFM model, the feature vector corresponding to each feature is more accurate such that both the contribution of the second-order feature interaction and the contribution of the higher-order feature interaction are more accurate. Therefore, the predicted score obtained using the method in this embodiment of this application is also more accurate.

Obtaining the contribution of the second-order feature interaction based on the foregoing implementation 2 is equivalent to improving a model obtained by directly combining the FFM model and a DNN model. Because the DeepFM model determines the contribution of the first-order feature and the contribution of the second-order feature interaction based on the FM model, and the FM model has a weaker expression capability than the FFM model, a deep neural network part in the DeepFM model is also limited by an expression capability of an FM part when determining the contribution of the higher-order feature interaction. Consequently, a prediction result of the DeepFM model is not accurate enough. On this basis, to improve accuracy of a prediction result, one idea is to combine the FFM model and the DNN model. However, because an over-fitting problem of the FFM model may occur, the combination of the FFM model and the DNN model cannot be actually implemented. In this embodiment of this application, the over-fitting problem is alleviated by improving the feature vector corresponding to each feature in order to provide a feasible solution for combining the FFM model and the DNN model. In other words, if the contribution of the second-order interaction is determined based on the implementation 2, the FFM model and the DNN model are combined, (where a model obtained after the combination may be referred to as a DeepFFM model), to determine the predicted score such that the predicted score is more accurate.

Step 304. Recommend the target object to the user when the predicted score is greater than or equal to a preset threshold. The preset threshold may be set based on an actual requirement and experience. This is not specifically limited.

It can be learned from the foregoing content that, in this embodiment of this application, the feature vector is determined based on the probability distribution information that the R elements obey. Compared with a result of determining a feature vector in the FM model, the FFM model, and the DeepFM model directly through point estimation, the prediction result in this embodiment of the application better satisfies a real situation, and prediction precision is higher.

It should be noted that the procedure described in step 301 to step 304 is a procedure for predicting one piece of to-be-predicted data. In a specific implementation, a plurality of pieces of to-be-predicted data may be separately predicted using step 301 to step 304. For example, for a user, predicted scores corresponding to a plurality of applications clicked by the user may be separately obtained using step 301 to step 304, and then an application whose predicted score is greater than the preset threshold is recommended to the user. It may be understood that, after the predicted scores corresponding to the plurality of applications clicked by the user are obtained through prediction, an application ranking ahead may alternatively be selected from applications whose predicted score is greater than the preset threshold and be recommended to the user. In other words, after the predicted score is obtained using the method in this embodiment of this application, there may be a plurality of implementations for recommending an application to the user based on the predicted score. This is not specifically limited in this embodiment of this application.

The DeepFFM model provided in this embodiment of this application is mainly used as an example for specific description in the following with reference to FIG. 4 and FIG. 5.

Figure 4:
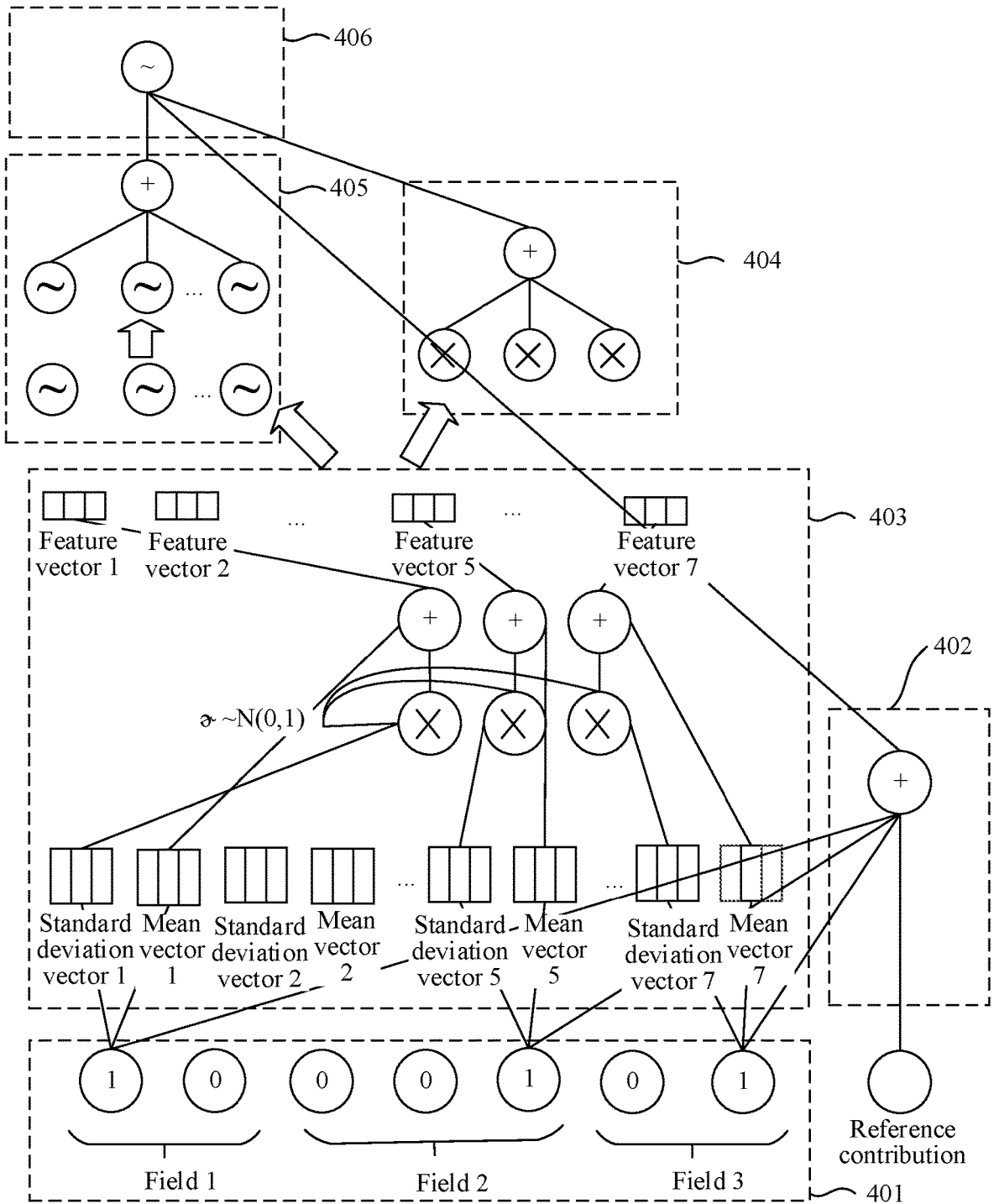
FIG. 4 is a schematic diagram of a model architecture of a DeepFFM model according to an embodiment of this application.

FIG. 4 is a schematic diagram of a model architecture of the DeepFFM model according to an embodiment of this application. As shown in FIG. 4, the model architecture includes a data generation module 401, a width model module 402, a feature vector probability distribution module 403, a feature lower-order interaction module 404, a feature higher-order interaction module 405, and a prediction result integration module 406. FIG. 5 is a schematic diagram of a data flow direction provided based on the model architecture in FIG. 4.

After receiving a prediction request, the data generation module extracts user information, application information, and environment information from a log database, to obtain to-be-predicted data of a user for a target object, and generates a feature sequence (referring to 1, 0, 0, 0, 1, 0, 1 shown in 401 in FIG. 4) based on the to-be-predicted data of the user for the target object and according to a preset encoding rule in order to satisfy an input required by the width model module, the feature lower-order interaction module, and the feature higher-order interaction module. An action performed by the data generation module may include step 301 in the foregoing.

The width model module obtains, in advance based on training of sample data, a weight value corresponding to each feature, and stores the weight value corresponding to each feature. In addition, the width model module further stores a reference contribution. After receiving the feature sequence generated by the data generation module, the width model module obtains, through query based on an identifier of each feature, a weight value corresponding to each feature. Then, the width model module calculates a sum of products of a value of each feature and the weight value corresponding to each feature, to obtain a contribution of a first-order feature, and then adds the contribution of the first-order contribution and the reference contribution, to obtain a contribution other than a feature interaction part, for example, which may be $$y_{DeepFFM1} = w_0 + (w_1 + w_5 + w_7)$$

where $y_{DeepFRW1}$ represents the contribution other than the feature interaction part, $w_0$ represents the reference contribution, $w_1$ represents a weight value corresponding to a first feature (that is, profession=teacher), $w_5$ represents a weight value corresponding to a fifth feature (that is, time=2018/8/1), and $w_7$ represents a weight value corresponding to a seventh feature (that is, type=music).

It should be noted that, in FIG. 4, the first feature "1" in 401 is connected to "+" in 402, and it indicates that a product of a value of the first feature and a weight value corresponding to the first feature is used as an input of "+" in 402. The fifth feature and the seventh feature each have a same meaning as the first feature. It can be understood that, FIG. 4 shows only a case in which the first feature, the fifth feature, and the seventh feature are connected to "+" in 402. In a specific implementation, a same operation may also be performed on another feature. This is not specifically limited.

The feature vector probability distribution module obtains, based on training of the sample data, probability distribution information corresponding to each feature, and stores the probability distribution information corresponding to each feature. For example, probability distribution information corresponding to the first feature includes probability distribution information that three elements obey. In this case, a standard deviation vector 1 shown in 403 is a vector constituted by standard deviations of Gaussian distribution that the three elements obey, and a mean vector 1 is a vector constituted through the Gaussian distribution that the three elements obey. Further, a feature vector 1 corresponding to the first feature may be obtained based on the standard deviation vector 1 and the mean vector 1 using a UCB policy. "x" and "+" shown in 403 are used to show specific calculation of the UCB policy, that is, the feature vector 1=the mean vector 1+∂ x the standard deviation vector 1. It may be understood that, the first feature may correspond to a plurality of feature vectors. FIG. 4 shows only a process of calculating a feature vector corresponding to the first feature. For example, feature vectors corresponding to the first feature may include $v_{1,f_1}$, $v_{1,f_2}$, $v_{1,f_3}$ feature vectors corresponding to the fifth feature may include $v_{5,f_1}$, $v_{5,f_2}$, $v_{5,f_3}$ and feature vectors corresponding to the seventh feature may include $v_{7,f_1}$, $v_{7,f_2}$, $v_{7,f_3}$. An action performed by the feature vector probability distribution module may include step 302 in the foregoing.

After receiving the feature vector generated by the feature vector probability distribution module, the feature lower-order interaction module obtains a contribution value of every two feature vectors by performing an inner product operation on the two feature vectors, and then obtains a contribution of second-order feature interaction. For example, the contribution of the second-order feature interaction may be $$y_{DeepFFM2} < v_{1,f_2}, v_{5,f_1} > + < v_{1,f_3}, v_{7,f_1} > + < v_{5,f_3}, v_{7,f_2} >$$

After receiving the feature vector generated by the feature vector probability distribution module, the feature higher-order interaction module obtains a contribution of higher-order feature interaction through calculation using a neural network module. The neural network module obtains, in advance based on training of the sample data, a weight matrix of a neural network, and stores the weight matrix of the neural network. After receiving the feature vector generated by the feature vector probability distribution module, the neural network module uses the feature vector as an input of the neural network, and finally obtains the contribution of the higher-order feature interaction by calculating a value of each neuron node layer by layer.

Specifically, if $r^h$ is used to represent a neuron at an $h^{th}$ layer, $W^h$ represents a weight of a connecting edge between the neuron at the $h^{th}$ layer and a neuron at an $(h+1)^{th}$ layer, $b^h$ represents a bias of the corresponding connecting edge, and A represents an activation function, a formula for calculating the neuron at the $h^{th}$ layer of the neural network is $r^{h+1} = A(W^h r^h + b^h)$. If the neural network has a total of H layers, a neuron value at a final output layer is the contribution of the higher-order feature interaction, that is, an output of the feature higher-order interaction module $$y_{DeepFFM3} = r^H = A(W^{H-1} r^{H-1} + b^{H-1hhh}).$$

After receiving the contribution generated by the width model module, the contribution of the second-order feature interaction generated by the feature lower-order interaction module, and the contribution of the higher-order feature interaction generated by the feature higher-order interaction module, the prediction result integration module performs weighted summation on the contributions based on a weight value obtained through training in advance, to obtain a predicted score corresponding to an application clicked by the user.

Figure 5:
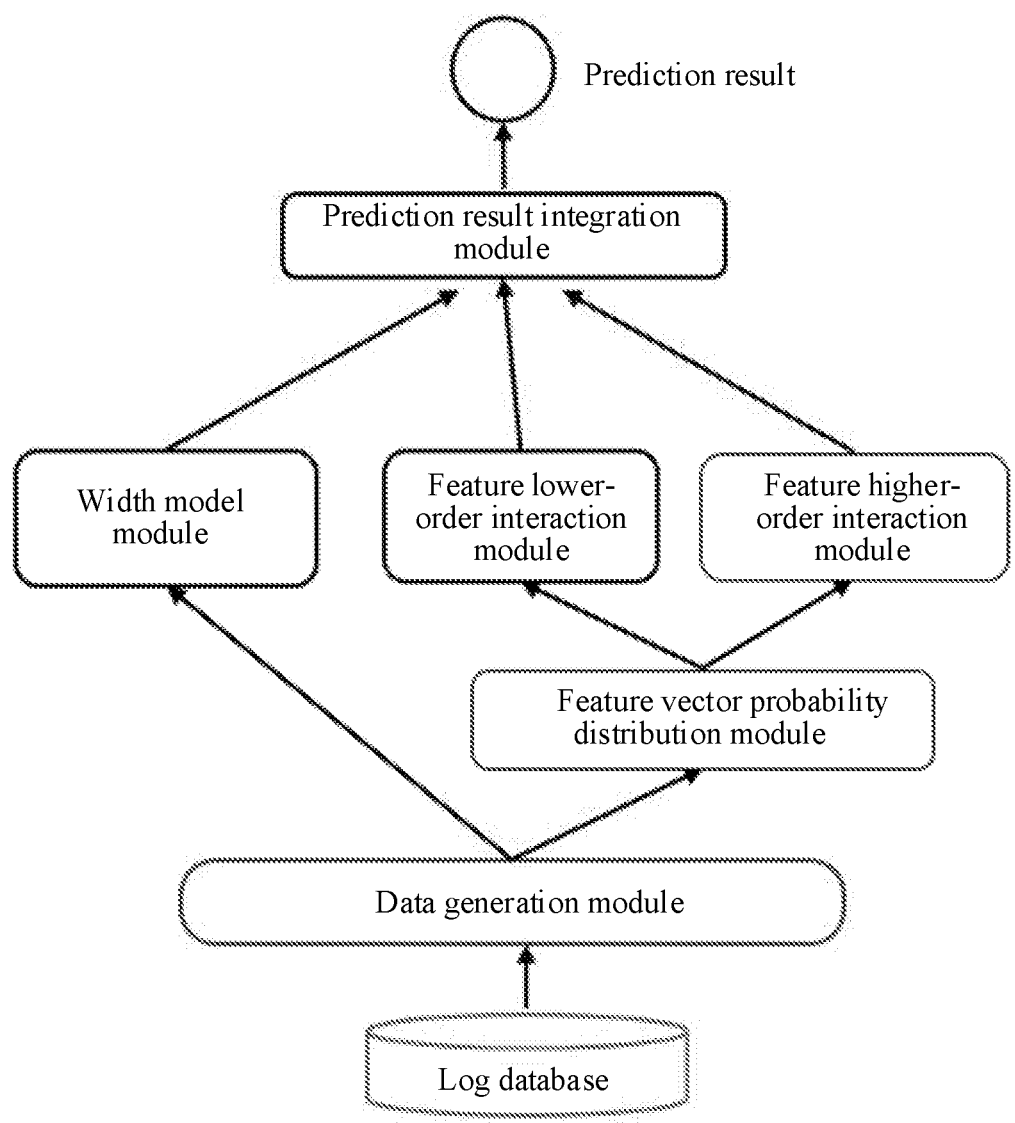
FIG. 5 is a schematic diagram of a data flow direction provided based on the model architecture in FIG. 4.

Implementation of a prediction phase is described in FIG. 3 to FIG. 5. The following still uses the DeepFFM model as an example to describe implementation of a training phase.

It can be learned from the foregoing description of the architecture of the DeepFFM model that, modules relating to training in the DeepFFM model may include the width model module (which trains the weight value corresponding to each feature), the feature vector probability distribution module (which trains probability distribution information of each element included in the feature vector corresponding to each feature), and the neural network module (which trains a deep neural network) in the feature higher-order interaction module.

Work of each layer in the deep neural network may be described using a mathematical expression $\vec{y} = \alpha(W \cdot \vec{x} + \vec{b})$. The work of each layer in the deep neural network may be physically understood as completing transformation from input space to output space (in an embodiment, row space to column space of a matrix) by performing five operations on the input space (a set of input vectors). The five operations include 1. dimension raising/dimension reduction, 2. scaling out/scaling in, 3. rotation, 4. translation, and 5. "bending". The operations 1, 2, and 3 are completed by $W \cdot \vec{x}$, the operation 4 is completed by +b, and the operation 5 is implemented by a( ). A reason of using the word "space" herein for description is that a classified object is not a single thing, but a kind of thing, and space refers to a set of all individuals of this kind of thing. W represents a weight vector, and each value in the vector represents a weight value of a neuron in a neural network at this layer. The vector W determines spatial transformation from the input space to the output space described above, in an embodiment, a weight W of each layer controls how to transform space. The deep neural network is trained to finally obtain a weight matrix (a weight matrix constituted by vectors W of many layers) of all layers of the trained neural network. Therefore, a process of training the neural network is essentially a manner of learning control of spatial transformation, and more specifically, learning a weight matrix.

In this embodiment of this application, it is expected that an output (in an embodiment, a sum of weights of the reference contribution, the contribution of the first-order feature, the contribution of the second-order feature, and the contribution of the higher-order feature interaction) of the DeepFFM model is close, as much as possible, to a value that is really expected in prediction as much as possible. Therefore, a current predicted value is compared with a target value that is really expected, and then at least one of the weight value corresponding to each feature, the probability distribution information of each element included in the feature vector corresponding to each feature, or a weight vector of each layer of neural network (certainly, there is usually an initialization process before a first update, and during initialization, a parameter may be preconfigured, for example, a parameter may be preconfigured for each layer in the deep neural network) is updated based on a difference between the current predicted value and the target value. For example, if a predicted value for the network is high, the weight value, the probability distribution information, or the weight vector is adjusted such that the predicted value for the network becomes lower. Adjustment is constantly performed until the target value that is really expected can be predicted. Therefore, "how to obtain, through comparison, a difference between a predicted value and a target value" needs to be predefined. This is a loss function or an objective function. The loss function and the objective function are equations used to measure a difference between a predicted value and a target value. For example, a higher output value (loss) of the loss function indicates a larger difference, and therefore, model training becomes a process of reducing the loss as much as possible.

Based on the architecture shown in FIG. 4, the following describes a training process of the DeepFFM model using one piece of sample data (the second piece of sample data in Table 2) as an example.

Figure 6:
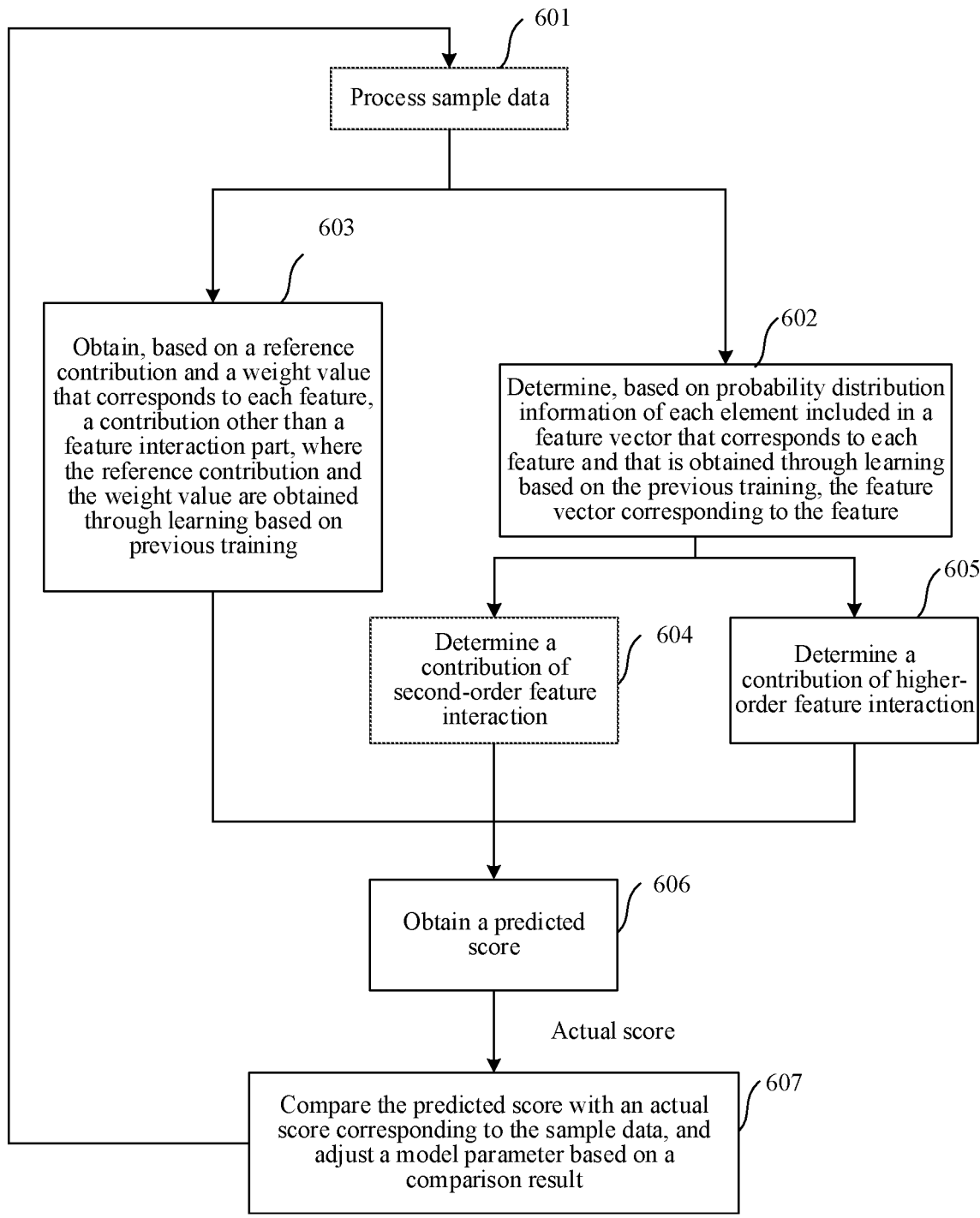
FIG. 6 is a schematic diagram of a training process of a DeepFFM model.

FIG. 6 is a schematic diagram of the training process of the DeepFFM model. As shown in FIG. 6, the process includes the following steps.

Step 601. The data generation module processes the sample data, and inputs a feature sequence (that is, [0 1 0 1 0 0 1]) obtained after the processing into the width model module and the feature vector probability distribution module.

Step 602. The feature vector probability distribution module determines, based on data generated by the data generation module and based on probability distribution information that corresponds to each feature and that is obtained through learning based on previous training, a feature vector corresponding to the feature, and inputs the feature vector corresponding to the feature into the feature lower-order interaction module and the feature higher-order interaction module.

Step 603. The width model module obtains, based on a reference contribution and a weight value that corresponds to each feature, a contribution other than a feature interaction part, where the reference contribution and the weight value are obtained through learning based on the previous training.

Step 604. The feature lower-order interaction module determines a contribution of second-order feature interaction based on the feature vector that corresponds to each feature and that is generated by the feature vector probability distribution module.

Step 605. The feature higher-order interaction module determines a contribution of higher-order feature interaction based on the feature vector that corresponds to each feature and that is generated by the feature vector probability distribution module and based on a weight matrix that is of a deep neural network and that is obtained through the previous training.

Step 606. The prediction result integration module performs weighted summation on the contribution generated by the width model module, the contribution of the second-order feature interaction generated by the feature lower-order interaction module, and the contribution of the higher-order feature interaction generated by the feature higher-order interaction module, to obtain a predicted score.

Step 607. Compare the predicted score with an actual score corresponding to the sample data, and adjust a model parameter based on a comparison result. In a specific implementation, the model parameter may be adjusted using a back-propagation method. Details are not described herein. The model parameter may include the weight value corresponding to each feature, probability distribution information of each element included in the feature vector corresponding to each feature, a weight vector of each layer of neural network, and the like. It may be understood that, the model parameter may further include another possible parameter. This is not specifically limited. Subsequently, the foregoing steps may be performed again to train a next piece of sample data.

It should be noted that (1) The foregoing step numbers are merely an example of an execution procedure, and do not constitute a limitation on an execution sequence of the steps. The procedure shown in FIG. 6 is described from only a perspective of logic implementation, and FIG. 6 is described based on only one piece of sample data. In a specific implementation, considering that an amount of sample data that needs to be trained is relatively large, a plurality of pieces of sample data may be simultaneously trained. This is not specifically limited. (2) Data used in a training phase is sample data, and has an actual score. In the training phase, the sample data may be first predicted using a procedure that is the same as that in a prediction phase, to obtain a predicted score, and then the predicted score is compared with the actual score, to adjust a model parameter. Therefore, for a specific implementation process of step 601 to step 605, refer to the foregoing step 301 to step 303. Step 607 relates to adjustment of the model parameter, and a specific adjustment manner in step 307 may use a back-propagation method or another method. This is not specifically limited. A difference between the training phase described in this embodiment of this application and a training phase of a DeepFFM model in other approaches lies in that, probability distribution information corresponding to each feature is trained in this embodiment of this application, while a feature vector corresponding to each feature is directly trained in the DeepFFM model.

It can be learned based on the foregoing description that, a difference between the DeepFFM model provided in this embodiment of this application and an existing DeepFM model mainly lies in that, for example, in the DeepFFM model, an FM part in the DeepFM model is replaced with an FFM part, and a field-aware feature vector is introduced such that an expression capability of the DeepFFM model can be enhanced, and for another example, in the DeepFFM model, a feature vector corresponding to each feature is determined based on probability distribution information corresponding to the feature such that an over-fitting problem can be effectively alleviated. For other content than the difference, refer to the DeepFM model, to implement the DeepFFM model. Details are not described herein.

To further describe an effect achieved by the DeepFFM model provided in this embodiment of the application, the inventor of this application uses two datasets (a Criteo dataset and an Avazu dataset) to perform an experiment on the DeepFFM model, an FM model, an FFM model, and the DeepFM model. Experiment 1 is where the Criteo dataset includes an advertisement click record in one month, and data of eight days is selected. Data of the first seven days is used as sample data (training data), and data of the last day is used as test data. Experiment 2 comprises 80% of data in the Avazu dataset is randomly selected as sample data, remaining 20% of the data is used as test data, and data that includes a feature that exists less than 20 times is deleted from the sample data. The following conclusion is obtained based on results of the experiment 1 and the experiment 2 where the DeepFFM model obtains a best experiment result (that is, prediction accuracy is the highest) in both the experiments, and the DeepFM model obtains a second best experiment result. Compared with that in the DeepFM model, an area under the curve (AUC) in the DeepFFM model is increased by 0.1% to 0.3%.

It should be noted that the foregoing content describes a specific implementation process of this embodiment of the application using only an application store scenario as an example. It may be understood that, the method in this embodiment of the application is also applicable to another possible scenario. For example, in this embodiment of the application, determining, based on probability distribution information corresponding to a feature, a feature vector corresponding to the feature may also be used in fields such as decision-making and inference, and natural language processing. For example, in the natural language processing, many semantic models may also use an idea in this embodiment of the application to improve model accuracy and robustness. This embodiment of the application is not limited to prediction for a click behavior of a user for an application. For example, the idea in this embodiment of the application may also be used in fields such as music, a video, and a commodity.

The foregoing mainly describes the solution provided in this application from a perspective of a method procedure. It may be understood that, to implement the foregoing functions, an apparatus may include corresponding hardware structures and/or software modules for performing the functions. A person skilled in the art should be easily aware that, in combination with the examples described in the embodiments disclosed in this specification, units and algorithm steps can be implemented by hardware or a combination of hardware and computer software in the application. Whether a function is performed by hardware or hardware driven by computer software depends on particular applications and design constraints of the technical solutions. A person skilled in the art may use different methods to implement the described functions for each particular application, but it should not be considered that the implementation goes beyond the scope of the application.

Figure 7:
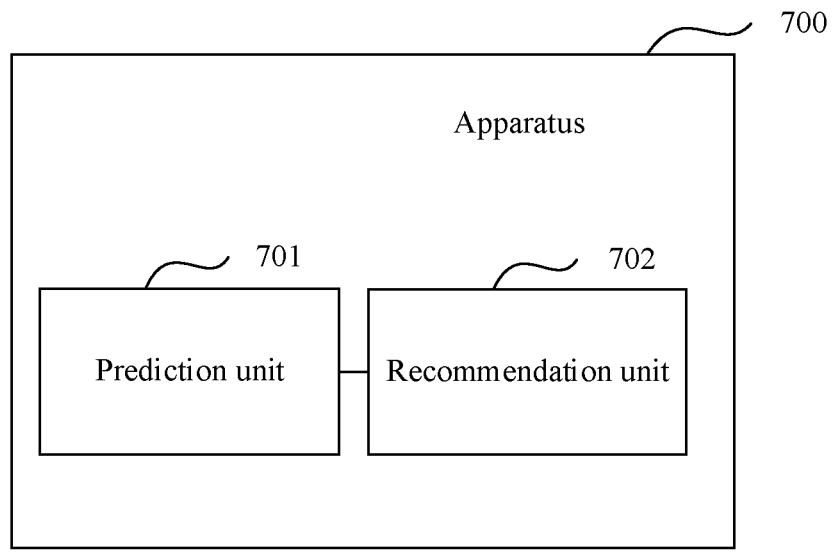
FIG. 7 is a possible example block diagram of an apparatus according to an embodiment of this application.

When an integrated unit is used, FIG. 7 is a possible example block diagram of an apparatus according to an embodiment of this application. The apparatus 700 may exist in a form of software. The apparatus 700 may include a prediction unit 701 and a recommendation unit 702.

The apparatus 700 may be the execution device in FIG. 2, or may be the semiconductor chip disposed in the execution device. Specifically, in an embodiment, the prediction unit is configured to generate a feature sequence based on to-be-predicted data of a user for a target object and according to a preset encoding rule, where the feature sequence includes values of N features, and N is an integer, obtain probability distribution information corresponding to each feature in the feature sequence, and obtain, through calculation based on the probability distribution information corresponding to each feature, a feature vector corresponding to the feature, and obtain a predicted score of the user for the target object based on the values of the N features and the feature vector corresponding to each of the N features.

The recommendation unit is configured to recommend the target object to the user when the predicted score is greater than or equal to a preset threshold.

In a possible design, probability distribution information corresponding to a feature a includes probability distribution information that R elements obey, the feature a is any feature in the feature sequence, and R is an integer, and the prediction unit is further configured to calculate, based on the probability distribution information that the R elements obey, a feature vector corresponding to the feature a.

In a possible design, if a first element obeys Gaussian distribution, probability distribution information that the first element obeys includes a mean and a standard deviation of the Gaussian distribution, where the first element is any element in the R elements.

In a possible design, if a second element obeys uniform distribution, probability distribution information that the second element obeys includes a maximum value and a minimum value, where the second element is any element in the R elements.

In a possible design, the prediction unit is further configured to calculate, based on the probability distribution information that the R elements obey and according to a preset policy, a value corresponding to each of the R elements, and obtain, based on the values corresponding to the R elements, the feature vector corresponding to the feature a, where the feature vector corresponding to the feature a is R-dimensional, and values in R dimensions are in a one-to-one correspondence with the values corresponding to the R elements.

In a possible design, the preset policy is a Thompson sampling policy or an upper confidence bound policy.

In a possible design, the prediction unit is further configured to obtain a contribution of interaction between a feature b and a feature c through calculation based on values of the feature b and the feature c, a feature vector corresponding to the feature b, and a feature vector corresponding to the feature c, where the feature b and the feature c are any two features in the feature sequence, obtain a contribution of second-order feature interaction based on the contribution of the interaction between the feature b and the feature c, and obtain the predicted score of the user for the target object based on at least the contribution of the second-order feature interaction.

In a possible design, each feature in the feature sequence corresponds to one feature vector, and the prediction unit is further configured to obtain a first value through calculation based on an inner product of the feature vector corresponding to the feature b and the feature vector corresponding to the feature c, and obtain the contribution of the interaction between the feature b and the feature c through calculation based on the first value and a product of the values of the feature b and the feature c.

In a possible design, each feature in the feature sequence corresponds to M feature vectors, and the feature sequence includes M fields, M feature vectors corresponding to the feature a are M field-aware feature vectors respectively constituted by the feature a and the M fields, and the feature a is any feature in the feature sequence, and the prediction unit is further configured to obtain a second value through calculation based on an inner product of a first feature vector corresponding to the feature b and a second feature vector corresponding to the feature c, where the first feature vector is a field-aware feature vector constituted by the feature b and a field to which the feature c belongs, and the second feature vector is a field-aware feature vector constituted by the feature c and a field to which the feature b belongs, and obtain the contribution of the interaction between the feature b and the feature c through calculation based on the second value and a product of the values of the feature b and the feature c.

In a possible design, the prediction unit is further configured to obtain a contribution of a first-order feature based on the values of the N features and a weight value corresponding to each of the N features, obtain a contribution of higher-order feature interaction based on the values of the N features, the feature vector corresponding to each of the N features, and a weight matrix of a neural network, and perform weighted summation on a reference contribution, the contribution of the first-order feature, the contribution of the second-order feature interaction, and the contribution of the higher-order feature interaction, to obtain the predicted score of the user for the target object.

It should be noted that actions performed by the prediction unit may include actions performed by the data generation module, the width model module, the feature lower-order interaction module, the feature higher-order interaction module, and the prediction result integration module in the architecture of the DeepFFM model shown in FIG. 4.

In this embodiment of this application, unit division is an example, and is merely logical function division. In actual implementation, another division manner may be used. Functional units in this embodiment of this application may be integrated into one processing module, or each of the units may exist alone physically, or two or more units are integrated into one unit. The integrated unit may be implemented in a form of hardware, or may be implemented in a form of a software functional unit.

When the integrated unit is implemented in the form of a software functional unit and sold or used as an independent product, the integrated unit may be stored in a computer-readable storage medium. Based on such understanding, the technical solutions of this application essentially, or the part contributing to other approaches, or all or a part of the technical solutions may be implemented in a form of a software product. The computer software product is stored in a storage medium, and includes several instructions for instructing a computer device (which may be a personal computer, a server, a network device, or the like) or a processor to perform all or some of the steps of the methods described in the embodiments of this application. The foregoing storage medium includes various mediums that can store program code, such as a USB flash drive, a removable hard disk, a read-only memory (ROM), a random access memory (RAM), a magnetic disk, or an optical disc.

Figure 8:
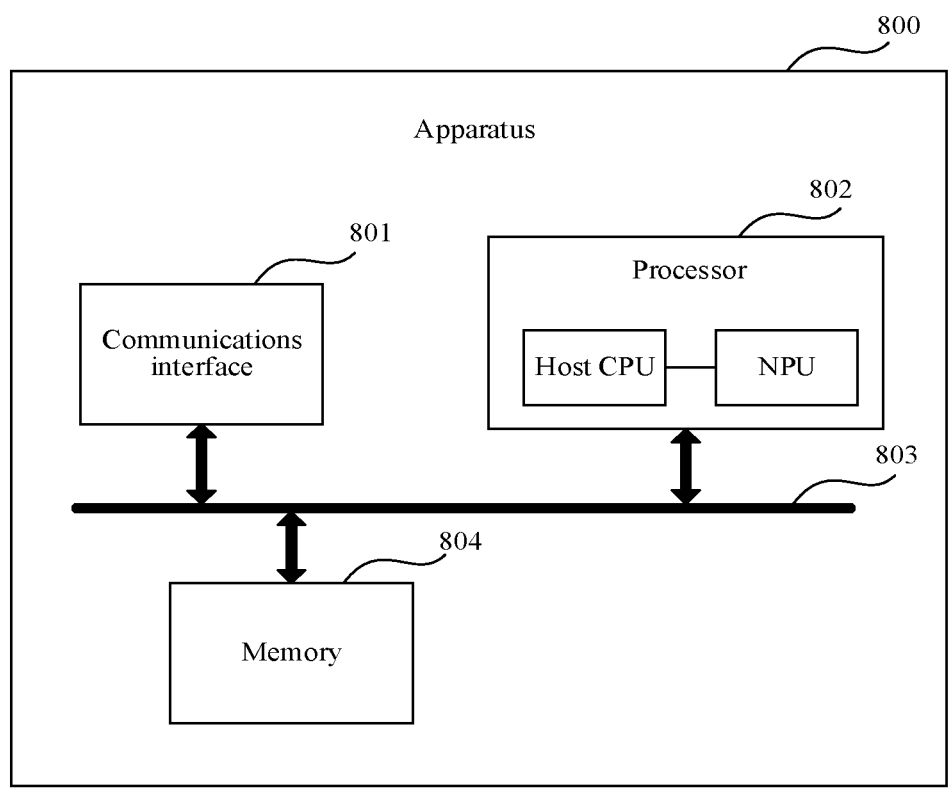
FIG. 8 is a schematic structural diagram of an apparatus according to an embodiment of this application.

FIG. 8 is a schematic structural diagram of an apparatus according to an embodiment of this application. The apparatus may be the execution device shown in FIG. 2, and is configured to implement the procedure or the steps in the method embodiment shown in FIG. 3. Referring to FIG. 8, the apparatus 800 includes a communications interface 801 and a processor 802.

The communications interface 801 is configured to communicate and interact with a client device. The communications interface 801 may be an RF circuit, a Wi-Fi module, or the like. This is not specifically limited. The processor 802 is configured to implement functions of a data obtaining unit, a feature vector obtaining unit, and the prediction unit in FIG. 7, for example, may be a general-purpose CPU, a general-purpose processor, a digital signal processing (DSP), an ASIC, an FPGA or another programmable logic device, a transistor logic device, a hardware component, or any combination thereof. The processor 802 may implement or execute various examples of logical blocks, modules, and circuits described with reference to content disclosed in the application. Alternatively, the processor may be a combination of processors implementing a computing function, for example, a combination of one or more microprocessors, or a combination of the DSP and a microprocessor.

Optionally, the apparatus 800 may further include a memory 804 configured to store a program and the like. Specifically, the program may include program code, and the program code includes an instruction. The memory 804 may include a RAM, or may include a non-volatile memory, for example, at least one magnetic disk memory. The processor 802 executes the application program stored in the memory 804, to implement the foregoing function.

In a possible manner, the communications interface 801, the processor 802, and the memory 804 are communicatively connected. For example, the communications interface 801, the processor 802, and the memory 804 may be connected to each other through a bus 803. The bus 803 may be a Peripheral Component Interconnect (PCI) bus, an extended industry standard architecture (EISA) bus, or the like. The bus may be classified into an address bus, a data bus, a control bus, and the like. For ease of representation, only one thick line is used to represent the bus in FIG. 8, but this does not mean that there is only one bus or only one type of bus.

In a possible manner, the processor 802 may include a neural network processor (NPU) and a host CPU. The NPU is used as a coprocessor mounted to the host CPU and a task is assigned by the host CPU.

Figure 9:
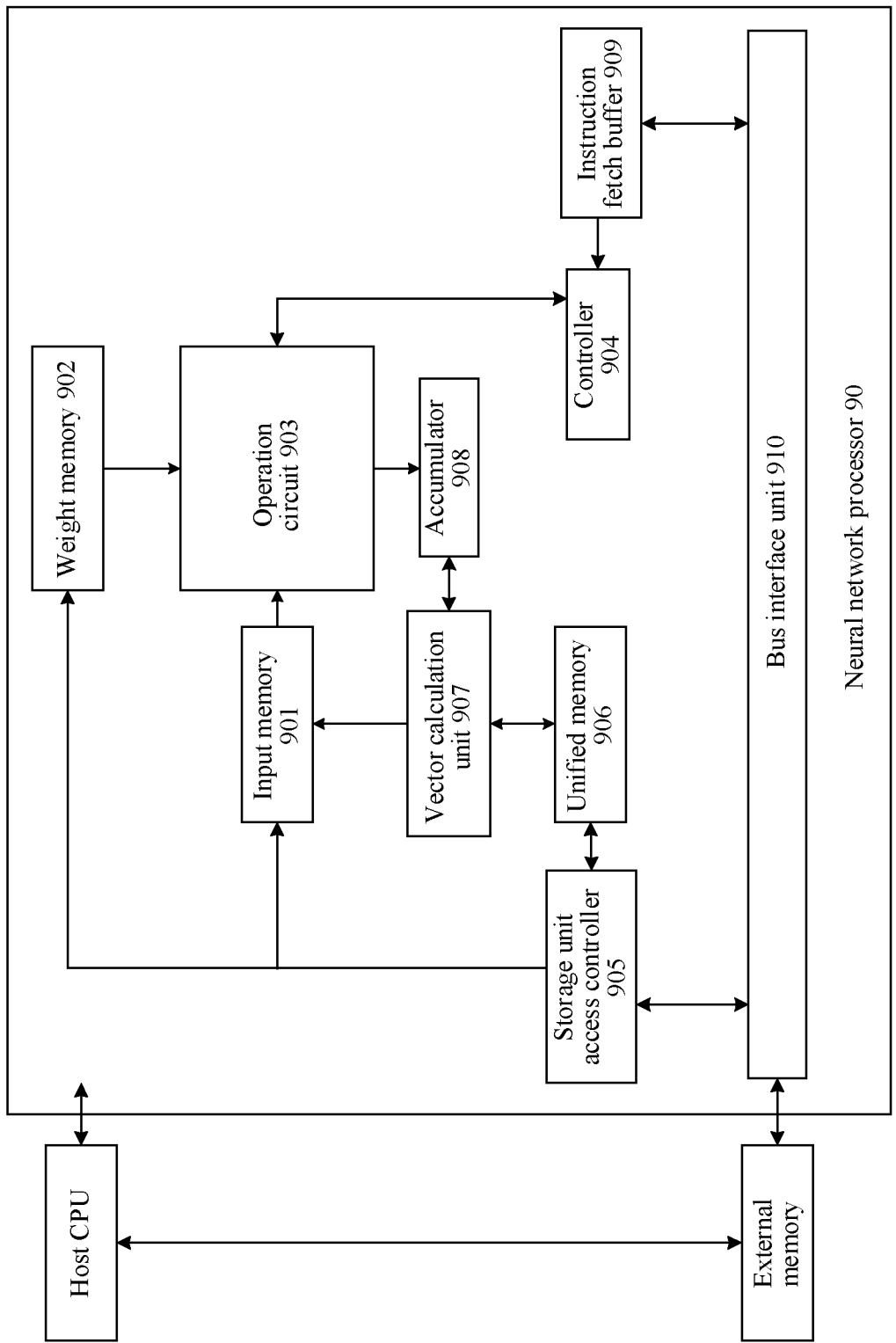
FIG. 9 is a possible schematic structural diagram of an NPU.

FIG. 9 is a possible schematic structural diagram of an NPU. A core part of the NPU 90 is an operation circuit 903, and a controller 904 controls the operation circuit 903 to extract data in a memory (a weight memory or an input memory) and perform an operation.

In some implementations, the operation circuit 903 includes a plurality of processing units (PE) inside. In some implementations, the operation circuit 903 is a two-dimensional systolic array. The operation circuit 903 may alternatively be a one-dimensional systolic array or another electronic circuit that can perform mathematical operations such as multiplication and addition. In some implementations, the operation circuit 903 is a general-purpose matrix processor.

For example, it is assumed that there are an input matrix A, a weight matrix B, and an output matrix C. The operation circuit fetches data corresponding to the matrix B from a weight memory 902 and buffers the data on each PE of the operation circuit. The operation circuit fetches data of the matrix A from an input memory 901, to perform a matrix operation on the matrix B, and store an obtained partial result or an obtained final result of the matrix into an accumulator 908.

A vector calculation unit 907 may perform further processing such as vector multiplication, vector addition, an exponent operation, a logarithm operation, or value comparison on an output of the operation circuit 903. For example, the vector calculation unit 907 may be configured to perform network computing, such as pooling, batch normalization), or local response normalization, at a non-convolution/non-fully connected (FC) layer in a neural network.

In some implementations, the vector calculation unit 907 can store, in a unified cache 906, an output vector that has been processed. For example, the vector calculation unit 907 may apply a non-linear function to the output of the operation circuit 903, for example, to a vector of an accumulated value in order to generate an activation value. In some implementations, the vector calculation unit 907 generates a normalized value, a combined value, or both. In some implementations, the output vector that has been processed can be used as an activation input of the operation circuit 903, for example, can be used in a subsequent layer in the neural network.

The unified memory 906 is configured to store input data and output data. For example, the input data in this embodiment of this application may be a feature vector corresponding to each feature in a feature sequence, and the output data may be a contribution of higher-order feature interaction.

A direct memory access controller (DMAC) 909 transfers input data in an external memory to the input memory 901 and/or the uniform memory 906, stores weight data in the external memory into the weight memory 902, and stores data in the uniform memory 906 into the external memory.

A bus interface unit (BIU) 910 is configured to implement interaction between a host CPU, the DMAC, and an instruction fetch buffer 909 through the bus.

The instruction fetch buffer 909 connected to the controller 904 is configured to store an instruction used by the controller 904.

The controller 904 is configured to invoke the instruction buffered in the instruction fetch buffer 909, to control a working process of the operation accelerator.

Generally, the unified memory 906, the input memory 901, the weight memory 902, and the instruction fetch memory 909 each are an on-chip memory. The external memory is a memory outside the NPU. The external memory may be a double data rate synchronous dynamic random access memory (DDR SDRAM), a high bandwidth memory (HBM), or another readable and writable memory.

In this embodiment of this application, content shown in FIG. 3, FIG. 4, and FIG. 5 may be completed by the host CPU and the NPU together. For example, an action performed by the feature higher-order interaction module shown in FIG. 4 may be completed by the NPU, and actions performed by other modules may be completed by the host CPU. A prediction process is used as an example, and a possible implementation process is as follows. The host processor processes to-be-predicted data to obtain a feature sequence, determines, based on probability distribution information corresponding to each feature in the feature sequence, a feature vector corresponding to the feature, and stores the feature vector corresponding to each feature into the external memory. Correspondingly, the storage unit access controller 909 in the NPU may transfer input data (in an embodiment, the feature vector corresponding to each feature) in the external memory to the input memory 901, and the operation circuit 903, the accumulator 908, and the like process the feature vector corresponding to each feature to obtain a contribution of higher-order feature interaction, and store the contribution into the unified memory 906. Subsequently, the storage unit access controller 909 may store output data (in an embodiment, the contribution of the higher-order feature interaction) in the unified memory 906 into the external memory. In this way, the host CPU may obtain the contribution of the higher-order feature interaction from the external memory, and then perform weighted summation on a reference contribution, a contribution of a first-order feature, a contribution of second-order feature interaction, and the contribution of the higher-order feature interaction, to obtain a predicted score of a user for a target object.

All or some of the foregoing embodiments may be implemented by means of software, hardware, firmware, or any combination thereof. When software is used to implement the embodiments, the embodiments may be implemented completely or partially in a form of a computer program product. The computer program product includes one or more computer instructions. When the computer program instructions are loaded and executed on a computer, the procedure or functions according to the embodiments of the application are all or partially generated. The computer may be a general-purpose computer, a dedicated computer, a computer network, or other programmable apparatuses. The computer instructions may be stored in a computer-readable storage medium or may be transmitted from a computer-readable storage medium to another computer-readable storage medium. For example, the computer instructions may be transmitted from a website, computer, server, or data center to another website, computer, server, or data center in a wired (for example, a coaxial cable, an optical fiber, or a digital subscriber line (DSL)) or wireless (for example, infrared, radio, and microwave, or the like) manner. The computer-readable storage medium may be any usable medium accessible by a computer, or a data storage device, such as a server or a data center, integrating one or more usable mediums. The usable medium may be a magnetic medium (for example, a floppy disk, a hard disk, or a magnetic tape), an optical medium (for example, a digital versatile disc (DVD)), a semiconductor medium (for example, a solid-state drive (SSD)), or the like.

A person skilled in the art should understand that the embodiments of the application may be provided as a method, a system, or a computer program product. Therefore, the embodiments of the application may use a form of hardware only embodiments, software only embodiments, or embodiments with a combination of software and hardware. Moreover, the embodiments of the application may use a form of a computer program product that is implemented on one or more computer-usable storage mediums (including but not limited to a disk memory, a compact disc ROM (CD-ROM), an optical memory, and the like) that include computer-usable program code.

The embodiments of the application are described with reference to the flowcharts and/or block diagrams of the method, the device (system), and the computer program product according to the embodiments of the application. It should be understood that computer program instructions may be used to implement each process and/or each block in the flowcharts and/or the block diagrams and a combination of a process and/or a block in the flowcharts and/or the block diagrams. These computer program instructions may be provided for a general-purpose computer, a dedicated computer, an embedded processor, or a processor of any other programmable data processing device to generate a machine such that the instructions executed by a computer or a processor of any other programmable data processing device generate an apparatus for implementing a specific function in one or more processes in the flowcharts and/or in one or more blocks in the block diagrams.

These computer program instructions may be stored in a computer-readable memory that can instruct the computer or any other programmable data processing device to work in a specific manner such that the instructions stored in the computer-readable memory generate an artifact that includes an instruction apparatus. The instruction apparatus implements a specific function in one or more processes in the flowcharts and/or in one or more blocks in the block diagrams.

These computer program instructions may be loaded onto a computer or any other programmable data processing device such that a series of operations and steps are performed on the computer or the any other programmable device, thereby generating computer-implemented processing. Therefore, the instructions executed on the computer or the any other programmable device provide steps for implementing a specific function in one or more processes in the flowcharts and/or in one or more blocks in the block diagrams.

Obviously, a person skilled in the art can make various modifications and variations to the embodiments of the application without departing from the spirit and scope of this application. This application is intended to cover these modifications and variations to the embodiments of the application provided that they fall within the scope of protection defined by the following claims and their equivalent technologies.

What is claimed is:

1. A method for training a machine learning model, the method comprising:
    generating a feature sequence based on to-be-predicted data of a user for a target object and according to a preset encoding rule, wherein the feature sequence comprises values of N features, and wherein N is an integer;
    subsequent to generating the feature sequence, obtaining probability distribution information corresponding to the N features;
    subsequent to obtaining the probability distribution information, obtaining feature vectors corresponding to the N features by obtaining, for each of the N features, a respective feature vector based on a respective subset of the probability distribution information that corresponds to the feature;
    obtaining a predicted score of the user for the target object based on the values of the N features and the feature vectors corresponding to the N features; and
    training the machine learning model by adjusting at least a portion of the probability distribution information that corresponds to one of the feature vectors.

2. The method of claim 1, wherein probability distribution information corresponding to a first feature comprises probability distribution information that R elements obey, wherein the first feature is any feature in the feature sequence, wherein R is an integer, wherein the recommendation method further comprises calculating a feature vector corresponding to the first feature based on the probability distribution information that the R elements obey.

3. The method of claim 2, wherein probability distribution information that a first element obeys comprises a mean and a standard deviation of a Gaussian distribution when the first element obeys the Gaussian distribution, wherein the first element is any element in the R elements.

4. The method of claim 2, wherein probability distribution information that a second element obeys comprises a maximum value and a minimum value when the second element obeys uniform distribution, wherein the second element is any element in the R elements.

5. The method of claim 2, further comprising:
    calculating a value corresponding to each of the R elements based on the probability distribution information that the R elements obey and according to a preset policy; and
    obtaining the feature vector corresponding to the first feature based on the values corresponding to the R elements, wherein the feature vector corresponding to the first feature is R-dimensional, and wherein values in R dimensions are in a one-to-one correspondence with the values corresponding to the R elements.

6. The method of claim 5, wherein the preset policy is a Thompson sampling policy or an upper confidence bound policy.

7. The method of claim 1, further comprising:
    obtaining a contribution of interaction between a second feature and a third feature based on values of the second feature and the third feature, a feature vector corresponding to the second feature, and a feature vector corresponding to the third feature, wherein the second feature and the third feature are any two of the N features in the feature sequence;
    obtaining a contribution of second-order feature interaction based on the contribution of the interaction between the second feature and the third feature; and
    obtaining the predicted score of the user for the target object based on at least the contribution of the second-order feature interaction.

8. The method of claim 7, wherein each of the N features in the feature sequence corresponds to one feature vector, wherein the recommendation method further comprises:
    obtaining a first value based on an inner product of the feature vector corresponding to the second feature and the feature vector corresponding to the third feature; and
    obtaining the contribution of the interaction between the second feature and the third feature based on the first value and a product of the values of the second feature and the third feature.

9. The method of claim 7, wherein each of the N features in the feature sequence corresponds to M feature vectors, wherein the feature sequence comprises M fields, wherein M feature vectors corresponding to a first feature are M field-aware feature vectors respectively constituted by the first feature and the M fields, wherein the first feature is any feature in the feature sequence, wherein the recommendation method further comprises:
  obtaining a second value based on an inner product of a first feature vector corresponding to the second feature and a second feature vector corresponding to the third feature, wherein the first feature vector is a field-aware feature vector constituted by the second feature and a field to which the third feature belongs, and wherein the second feature vector is a field-aware feature vector constituted by the third feature and a field to which the second feature belongs; and
  obtaining the contribution of the interaction between the second feature and the third feature based on the second value and a product of the values of the second feature and the third feature.

10. The method of claim 7, further comprising:
  obtaining a contribution of a first-order feature based on the values of the N features and a weight value corresponding to each of the N features;
  obtaining a contribution of higher-order feature interaction based on the values of the N features, wherein the feature vector corresponds to each of the N features and a weight matrix of a neural network; and
  performing weighted summation on a reference contribution, the contribution of the first-order feature, the contribution of the second-order feature interaction, and the contribution of the higher-order feature interaction to obtain the predicted score of the user for the target object.

11. An apparatus, comprising:
a processor; and
a memory coupled to the processor and storing instructions that, when executed by the processor, cause the apparatus to be configured to:
  generate a feature sequence based on to-be-predicted data of a user for a target object and according to a preset encoding rule, wherein the feature sequence comprises values of N features, and wherein N is an integer; and
  subsequent to generating the feature sequence, obtain probability distribution information corresponding to the N features;
  subsequent to obtaining the probability distribution information, obtain feature vectors corresponding to the N features by obtaining, for each feature of the N features, a respective feature based on a respective subset of the probability distribution information that corresponds to the feature;
  obtain a predicted score of the user for the target object based on the values of the N features and the feature vectors corresponding to the N features; and
  train a machine learning model by adjusting at least a portion of the probability distribution information that corresponds to one of the feature vectors.

12. The apparatus of claim 11, wherein probability distribution information corresponding to a first feature comprises probability distribution information that R elements obey, wherein the first feature is any feature in the feature sequence, and wherein R is an integer, wherein the instructions further cause the apparatus to be configured to calculate a feature vector corresponding to the first feature based on the probability distribution information that the R elements obey.

13. The apparatus of claim 12, wherein probability distribution information that a first element obeys comprises a mean and a standard deviation of a Gaussian distribution when the first element obeys the Gaussian distribution, wherein the first element is any element in the R elements.

14. The apparatus of claim 12, wherein probability distribution information that a second element obeys comprises a maximum value and a minimum value when the second element obeys uniform distribution, wherein the second element is any element in the R elements.

15. The apparatus of claim 12, wherein the instructions further cause the apparatus to be configured to:
  calculate a value corresponding to each of the R elements based on the probability distribution information that the R elements obey and according to a preset policy; and
  obtain the feature vector corresponding to the first feature based on the values corresponding to the R elements, wherein the feature vector corresponding to the first feature is R-dimensional, and wherein values in R dimensions are in a one-to-one correspondence with the values corresponding to the R elements.

16. The apparatus of claim 15, wherein the preset policy is a Thompson sampling policy or an upper confidence bound policy.

17. The apparatus of claim 11, wherein the instructions further cause the apparatus to be configured to:
  obtain a contribution of interaction between a second feature and a third feature based on values of the second feature and the third feature, a feature vector corresponding to the second feature, and a feature vector corresponding to the third feature, wherein the second feature and the third feature are any two of the N features in the feature sequence;
  obtain a contribution of second-order feature interaction based on the contribution of the interaction between the second feature and the third feature; and
  obtain the predicted score of the user for the target object based on at least the contribution of the second-order feature interaction.

18. The apparatus of claim 17, wherein each of the N features in the feature sequence corresponds to one feature vector, wherein the instructions further cause the apparatus to be configured to:
  obtain a first value based on an inner product of the feature vector corresponding to the second feature and the feature vector corresponding to the third feature; and
  obtain the contribution of the interaction between the second feature and the third feature based on the first value and a product of the values of the second feature and the third feature.

19. The apparatus of claim 17, wherein each of the N features in the feature sequence corresponds to M feature vectors, wherein the feature sequence comprises M fields, wherein M feature vectors corresponding to a first feature are M field-aware feature vectors respectively constituted by the first feature and the M fields, wherein the first feature is any feature in the feature sequence, wherein the instructions further cause the apparatus to be configured to:
  obtain a second value based on an inner product of a first feature vector corresponding to the second feature and a second feature vector corresponding to the third feature, wherein the first feature vector is a field-aware feature vector constituted by the second feature and a field to which the third feature belongs, and wherein the second feature vector is a field-aware feature vector constituted by the third feature and a field to which the second feature belongs; and obtain the contribution of the interaction between the second feature and the third feature based on the second value and a product of the values of the second feature and the third feature.

20. The apparatus of claim 17, wherein the instructions further cause the apparatus to be configured to:
  obtain a contribution of a first-order feature based on the values of the N features and a weight value corresponding to each of the N features; and
  obtain a contribution of higher-order feature interaction based on the values of the N features, wherein the feature vector corresponds to each of the N features, and a weight matrix of a neural network; and
  perform weighted summation on a reference contribution, the contribution of the first-order feature, the contribution of the second-order feature interaction, and the contribution of the higher-order feature interaction, to obtain the predicted score of the user for the target object.

\* \* \* \* \*